United States Patent [19]

Huang

[11] 4,107,783
[45] Aug. 15, 1978

[54] SYSTEM FOR PROCESSING ARITHMETIC INFORMATION USING RESIDUE ARITHMETIC

[75] Inventor: Alan Huang, Menlo Park, Calif.

[73] Assignee: The Board of Trustees of the Leland Stanford Junior University, Stanford, Calif.

[21] Appl. No.: 764,994

[22] Filed: Feb. 2, 1977

[51] Int. Cl.² .............................................. G06F 7/38
[52] U.S. Cl. .................................................. 364/746
[58] Field of Search ............. 235/156, 152; 350/96 R, 350/DIG. 2; 364/746

[56] References Cited

U.S. PATENT DOCUMENTS

| | | | |
|---|---|---|---|
| 3,167,645 | 1/1965 | Hoffmann et al. .................... | 235/156 |
| 3,609,328 | 9/1971 | Kieburtz .............................. | 235/156 |
| 3,996,455 | 12/1976 | Schaefer et al. ..................... | 235/152 |

OTHER PUBLICATIONS

P. W. Cheney, "A Digital Correlator Based on the Residue Number System," IRE Trans. on Electronic Computers, Mar. 1961, pp. 63–70.

*Primary Examiner*—David H. Malzahn
*Attorney, Agent, or Firm*—Flehr, Hohbach, Test, Albritton & Herbert

[57] ABSTRACT

A system for processing arithmetic information wherein the residue number system is used to partition a calculation into several simpler calculations each of which can be processed in parallel with complete independence. These segments are computationally simple such that all the arithmetic interactions can be ennumerated as mathematical "mappings". By routing signals through various "mappings" a number is encoded into residue form, processed in various ways, and eventually decoded back to a normal number system. The signals are routed in a manner to reflect calculations involving a plurality of operands and operations. By routing several signals in close sequence, calculations are pipelined. By routing different types of signals independently several calculations are carried out substantially simultaneously with each other. Detection of abnormalities in the signal from a given segment is used to exclude the segment from the decoding process thus preserving the correctness of the overall calculations notwithstanding an error in part of the computation.

72 Claims, 44 Drawing Figures

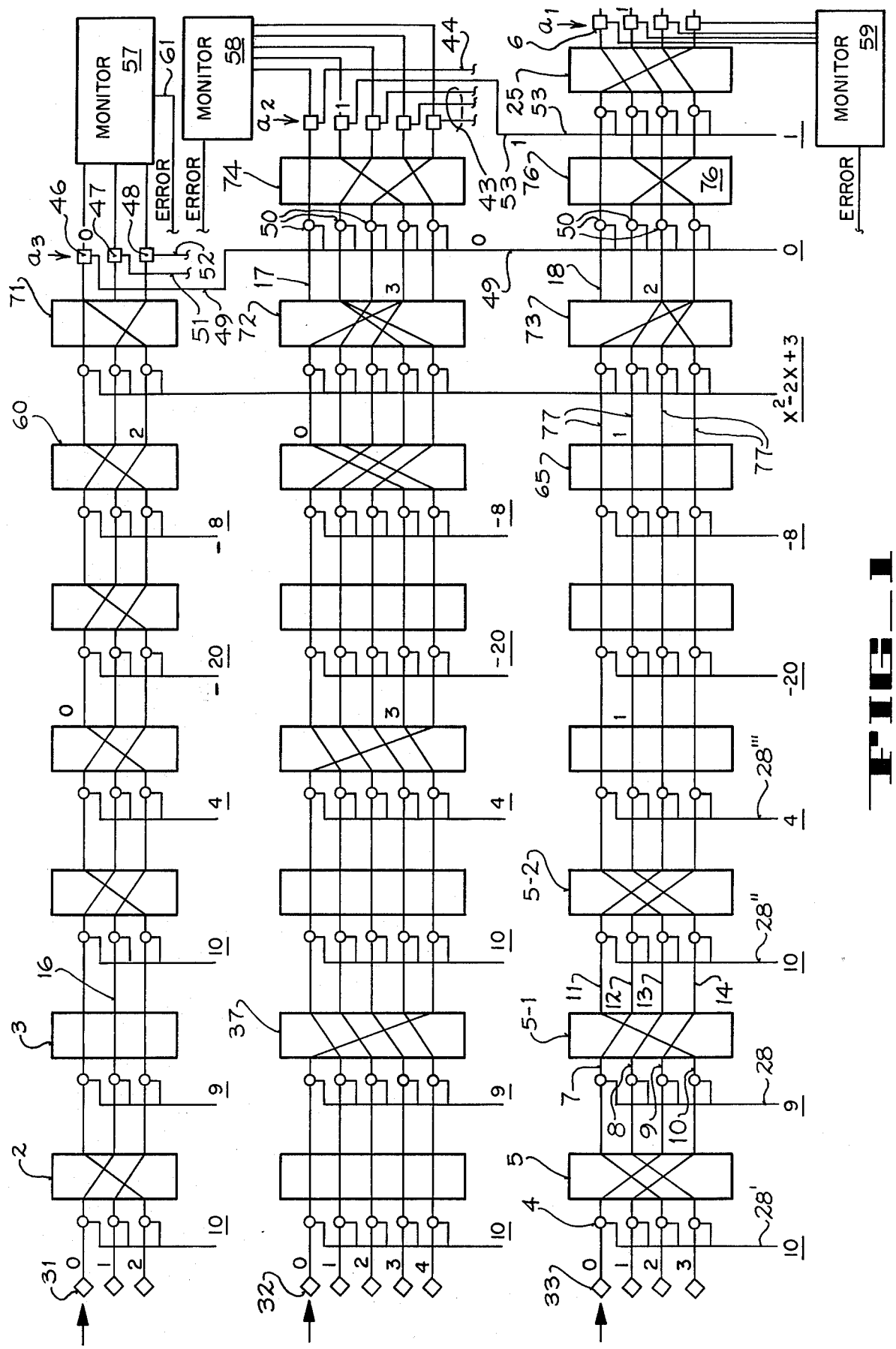
FIG_1

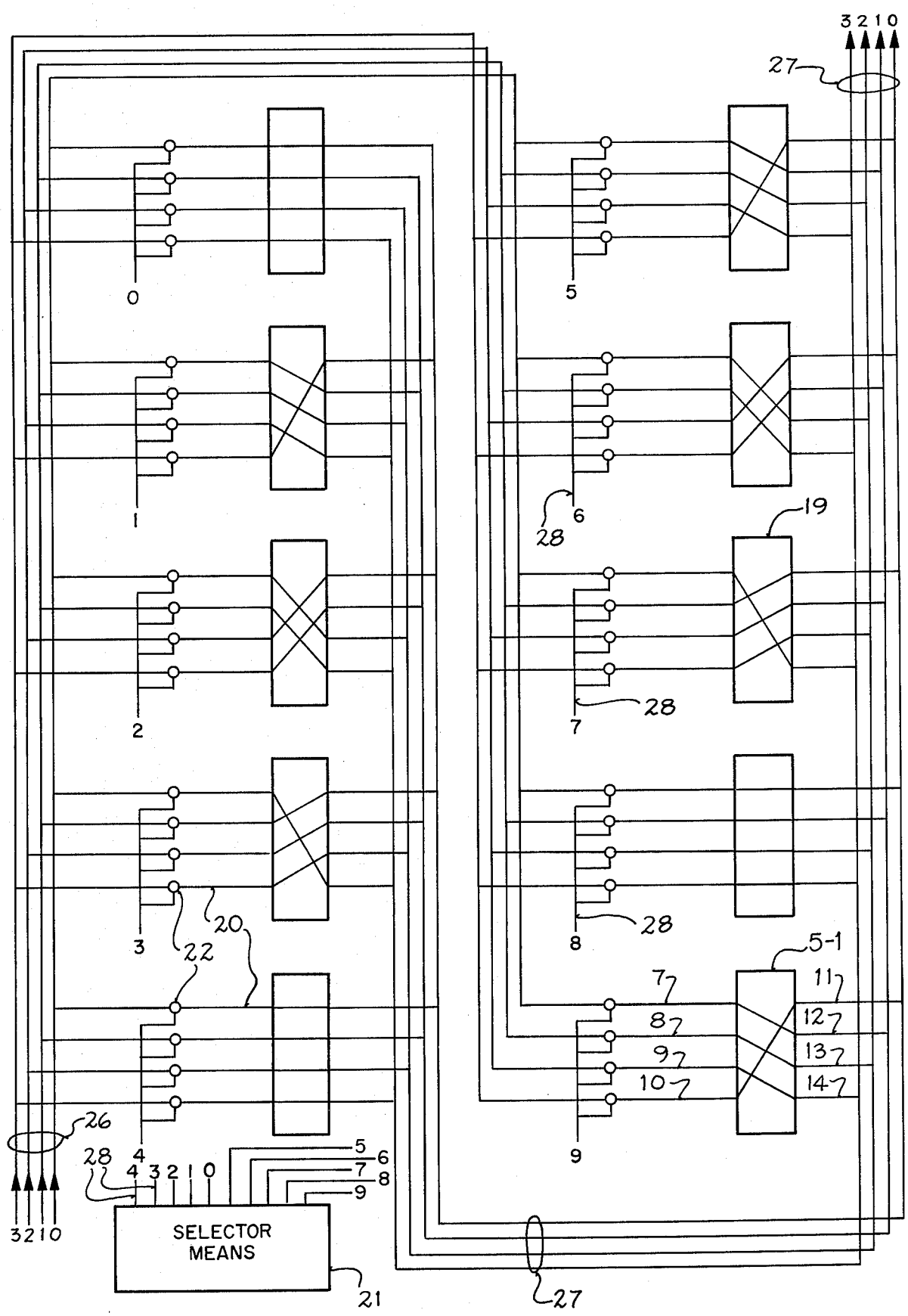
FIG_2

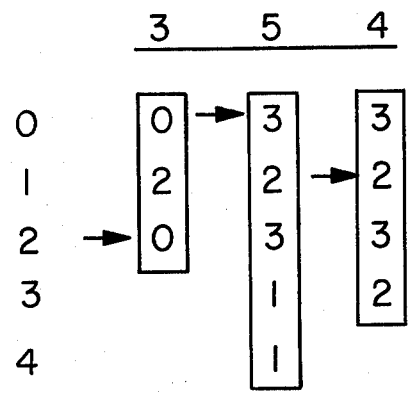

$P(X) = X^2 - 2X + 3$

FIG_6

FOR MODULUS 3

| | | | RESIDUE |
|---|---|---|---|
| RESIDUE DIGIT 0 | $P(0) =$ | $0 - 0 + 3 =$ | MOD(3,3) = 0 |
| 1 | $P(1) =$ | $1 - 2 + 3 =$ | MOD(2,3) = 2 |
| 2 | $P(2) =$ | $4 - 4 + 3 =$ | MOD(3,3) = 0 |

FOR MODULUS 5

| RESIDUE DIGIT 0 | $P(0) =$ | $0 - 0 + 3 =$ | MOD(3,5) = 3 |
|---|---|---|---|
| 1 | $P(1) =$ | $1 - 2 + 3 =$ | MOD(2,5) = 2 |
| 2 | $P(2) =$ | $4 - 4 + 3 =$ | MOD(3,5) = 3 |
| 3 | $P(3) =$ | $9 - 6 + 3 =$ | MOD(6,5) = 1 |
| 4 | $P(4) =$ | $16 - 8 + 3 =$ | MOD(11,5) = 1 |

FOR MODULUS 4

| RESIDUE DIGIT 0 | $P(0) =$ | $0 - 0 + 3 =$ | MOD(3,4) = 3 |
|---|---|---|---|
| 1 | $P(1) =$ | $1 - 2 + 3 =$ | MOD(2,4) = 2 |
| 2 | $P(2) =$ | $4 - 4 + 3 =$ | MOD(3,4) = 3 |
| 3 | $P(3) =$ | $9 - 6 + 3 =$ | MOD(6,4) = 2 |

$P_{10}(X) = X + 10$

FIG_9

FOR MODULUS 3

| | | RESIDUE |
|---|---|---|
| RESIDUE DIGIT 0 | $P(0) =$ | $0 + 10 = 1$ |
| 1 | $P(1) =$ | $1 + 10 = 2$ |
| 2 | $P(2) =$ | $2 + 10 = 0$ |

FOR MODULUS 5

| RESIDUE DIGIT 0 | $P(0) =$ | $0 + 10 = 0$ |
|---|---|---|
| 1 | $P(1) =$ | $1 + 10 = 1$ |
| 2 | $P(2) =$ | $2 + 10 = 2$ |
| 3 | $P(3) =$ | $3 + 10 = 3$ |
| 4 | $P(4) =$ | $4 + 10 = 4$ |

FOR MODULUS 4

| RESIDUE DIGIT 0 | $P(0) =$ | $0 + 10 = 2$ |
|---|---|---|
| 1 | $P(1) =$ | $1 + 10 = 3$ |
| 2 | $P(2) =$ | $2 + 10 = 0$ |
| 3 | $P(3) =$ | $3 + 10 = 1$ |

FIG_10

| MODULI | 3 | 5 | 4 |
|---|---|---|---|
| DIGIT 0 | 1 | 0 | 2 |
| 1 | 2 | 1 | 3 |
| 2 | 0 | 2 | 0 |
| 3 |   | 3 | 1 |
| 4 |   | 4 |   |

$P_9(X) = X + 9$

FOR MODULUS 3

| RESIDUE DIGIT | | | RESIDUE |
|---|---|---|---|
| 0 | P(0) = 0 + 9 = 9 | MOD 3 = 0 |
| 1 | P(1) = 1 + 9 = 10 | MOD 3 = 1 |
| 2 | P(2) = 2 + 9 = 11 | MOD 3 = 2 |

FOR MODULUS 5

| RESIDUE DIGIT | | |
|---|---|---|
| 0 | P(0) = 0 + 9 = 9 | MOD 5 = 4 |
| 1 | P(1) = 1 + 9 = 10 | MOD 5 = 0 |
| 2 | P(2) = 2 + 9 = 11 | MOD 5 = 1 |
| 3 | P(3) = 3 + 9 = 12 | MOD 5 = 2 |
| 4 | P(4) = 4 + 9 = 13 | MOD 5 = 3 |

FOR MODULUS 4

| RESIDUE DIGIT | | |
|---|---|---|
| 0 | P(0) = 0 + 9 = 9 | MOD 4 = 1 |
| 1 | P(1) = 1 + 9 = 10 | MOD 4 = 2 |
| 2 | P(2) = 2 + 9 = 11 | MOD 4 = 3 |
| 3 | P(3) = 3 + 9 = 12 | MOD 4 = 0 |

FIG_11
FIG_12

|   | 3 | 5 | 4 |
|---|---|---|---|
| 0 | 0 | 4 | 1 |
| 1 | 1 | 0 | 2 |
| 2 | 2 | 1 | 3 |
| 3 |   | 2 | 0 |
| 4 |   | 3 |   |

$P_4(X) = X + 4$

MOD 3
    0  $P(0) = 0 + 4 = 1$
→ 1  $P(1) = 1 + 4 = 2$
    2  $P(2) = 2 + 4 = 0$

MOD 5
→ 0  $P(0) = 0 + 4 = 4$
    1  $P(1) = 1 + 4 = 0$
    2  $P(2) = 2 + 4 = 1$
    3  $P(3) = 3 + 4 = 2$
    4  $P(4) = 4 + 4 = 3$

MOD 4
    0  $P(0) = 0 + 4 = 0$
    1  $P(1) = 1 + 4 = 1$
→ 2  $P(2) = 2 + 4 = 2$
    3  $P(3) = 3 + 4 = 3$

FIG_13A

| DIGIT | 3 | 5 | 4 |
|---|---|---|---|
| 0 | 1 | [4] | 0 |
| 1 | [2] | 0 | 1 |
| 2 | 0 | 1 | [2] |
| 3 |   | 2 | 3 |
| 4 |   | 3 |   |

FIG_13

FIG_16

$P(X) = X + [m_i - MOD(d * w, m_i)]$ (MOD 3 for numeral −20)
$P(0) = 0 + [3 - MOD(2 \cdot 10, 3)]$
     $= 0 + [3 - MOD(20, 3)]$
     $= 0 + [3 - 2] = 1$
$P(1) = 1 + [3 - 2] = 2$
$P(2) = 2 + [3 - 2] = 3 = 0$

| Mod 3 | |
|---|---|
| 0 | 1 |
| 1 | 2 |
| 2 | 0 |

FIG_17

(MOD 5 for numeral −20)
$P(0) = 0 + [5 - MOD(20, 5)]$
     $= 0 + [5 - 0]$
     $= 0 + 5 - 0 = 5 = 0$
$P(1) = 1 + [5 - 0] = 6 = 1$
$P(2) = 2 + [5 - 0] = 7 = 2$
$P(3) = 3 + [5 - 0] = 8 = 3$
$P(4) = 4 + [5 - 0] = 9 = 4$

| Mod 5 | |
|---|---|
| 0 | 0 |
| 1 | 1 |
| 2 | 2 |
| 3 | 3 |
| 4 | 4 |

| Mod 4 | |
|---|---|
| 0 | 0 |
| 1 | 1 |
| 2 | 2 |
| 3 | 3 |

(MOD 4 for −20)
$P(0) = 0 + [4 - MOD(20, 4)] = 4 - 0 = 4 = 0$
$P(1) = 1 + [4 - MOD(20, 4)] = 5 = 1$
$P(2) = 2 + [4 - MOD(20, 4)] = 6 = 2$
$P(3) = 3 + [4 - MOD(20, 4)] = 7 = 3$

FIG_18

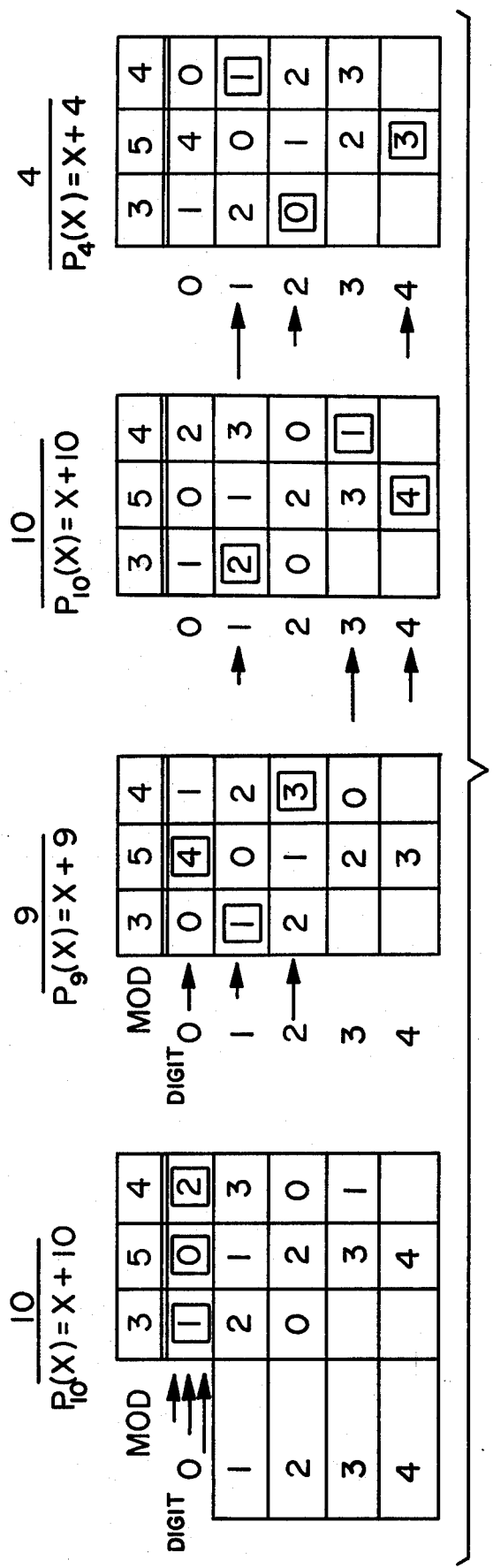
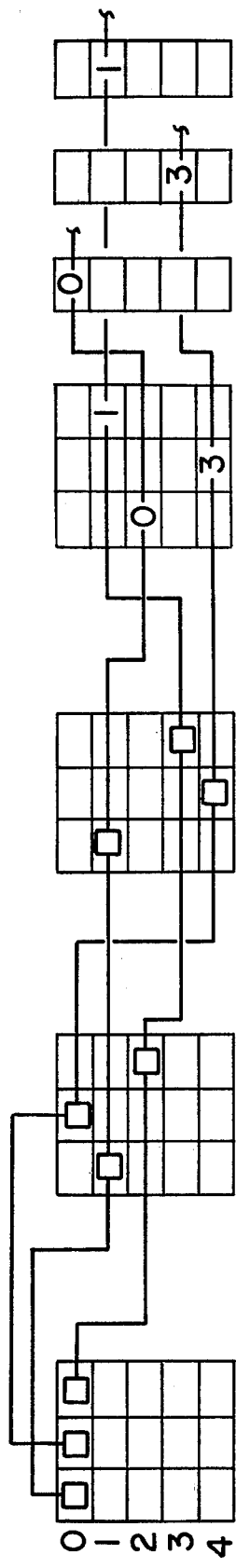
FIG._14   FIG._15

FIG_19

MOD 3

| 0 | 1 |
|---|---|
| 1 | 2 |
| 2 | 0 |

(MOD 3 for −8)

$P(0) = 0 + [3 - MOD(8 \cdot 1, 3)] = 3 - 2 = 1$
$P(1) = 1 + [3 - MOD(8, 3)] = 4 - 2 = 2$
$P(2) = 2 + [1] = 3 = 0$

FIG_20

MOD 5

| 0 | 2 |
|---|---|
| 1 | 3 |
| 2 | 4 |
| 3 | 0 |
| 4 | 1 |

(MOD 5 for −8)

$P(0) = 0 + [5 - MOD(8 \cdot 1, 5)] = 0 + 5 - 3 = 2$
$P(1) = 1 + 2 = 3$
$P(2) = 2 + 2 = 4$
$P(3) = 3 + 2 = 5 = 0$
$P(4) = 4 + 2 = 6 = 1$

FIG_21

MOD 4

| 0 | 0 |
|---|---|
| 1 | 1 |
| 2 | 2 |
| 3 | 3 |

(MOD 4 for −8)

$P(0) = 0 + [4 - MOD(8, 4)] = 0 + 4 - 0 = 4 = 0$
$P(1) = 1 + 4 = 5 = 1$
$P(2) = 2 + 4 = 6 = 2$
$P(3) = 3 + 4 = 7 = 3$

FIG_22

| MOD Digit | 3 | 5 | 4 |
|---|---|---|---|
| 0 | 1 | 0 | 0 |
| 1 | 2 | 1 | 1 |
| 2 | 0 | 2 | 2 |
| 3 |   | 3 | 3 |
| 4 |   | 4 |   |

−20

→

| | 3 | 5 | 4 |
|---|---|---|---|
| | 1 | 2 | 0 |
| | 2 | 3 | 1 |
| | 0 | 4 | 2 |
| | | 0 | 3 |
| | | 1 | |

−8

FIG_23

| | 3 | 5 | 4 |
|---|---|---|---|
| 0 → | 1 | 0 | 0 |
| 1 → | 2 | 1 | 1 |
| 2 | 0 | 2 | 2 |
| 3 → | | 3 | 3 |
| 4 | | 4 | |

−20

→

| 3 | 5 | 4 |
|---|---|---|
| 1 | 2 | 0 |
| 2 | 3 | 1 |
| 0 | 4 | 2 |
| | 0 | 3 |
| | 1 | |

−8

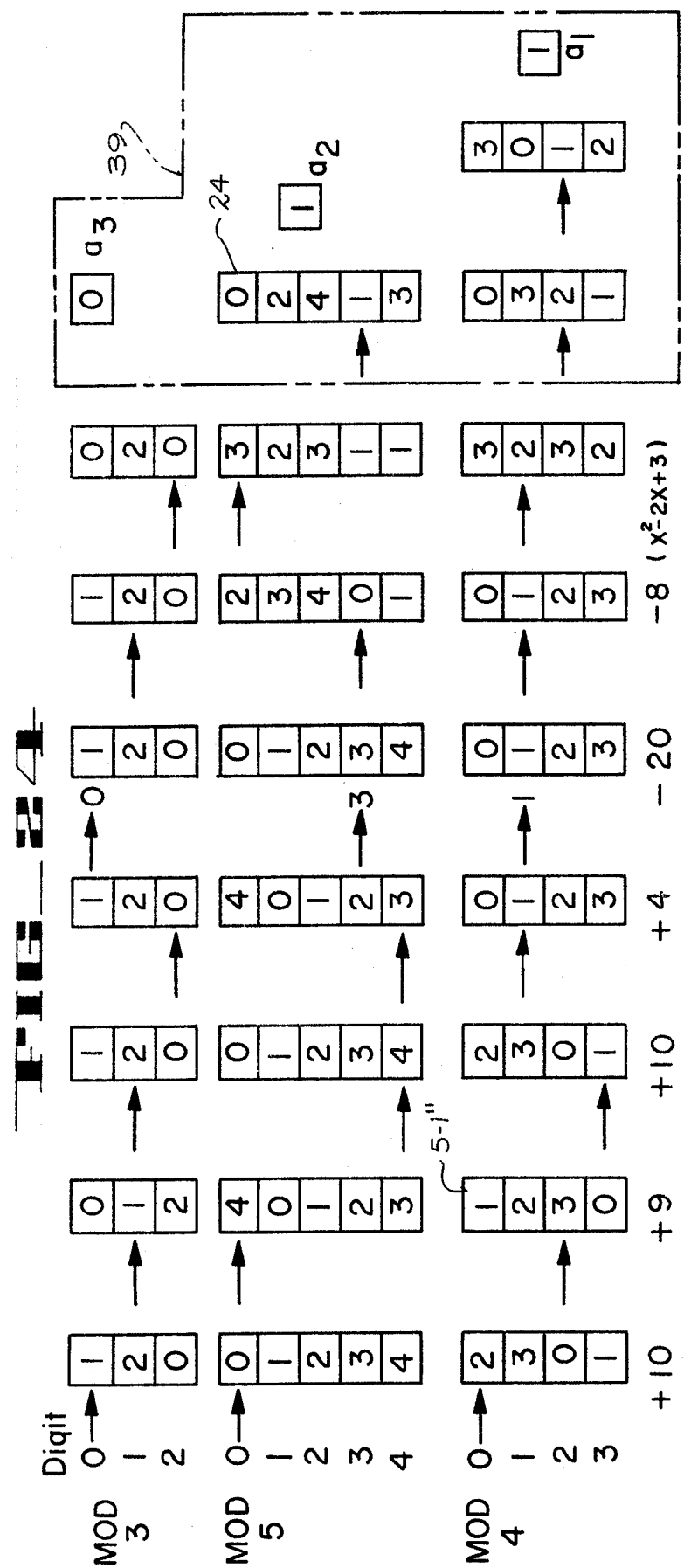
FIG_24

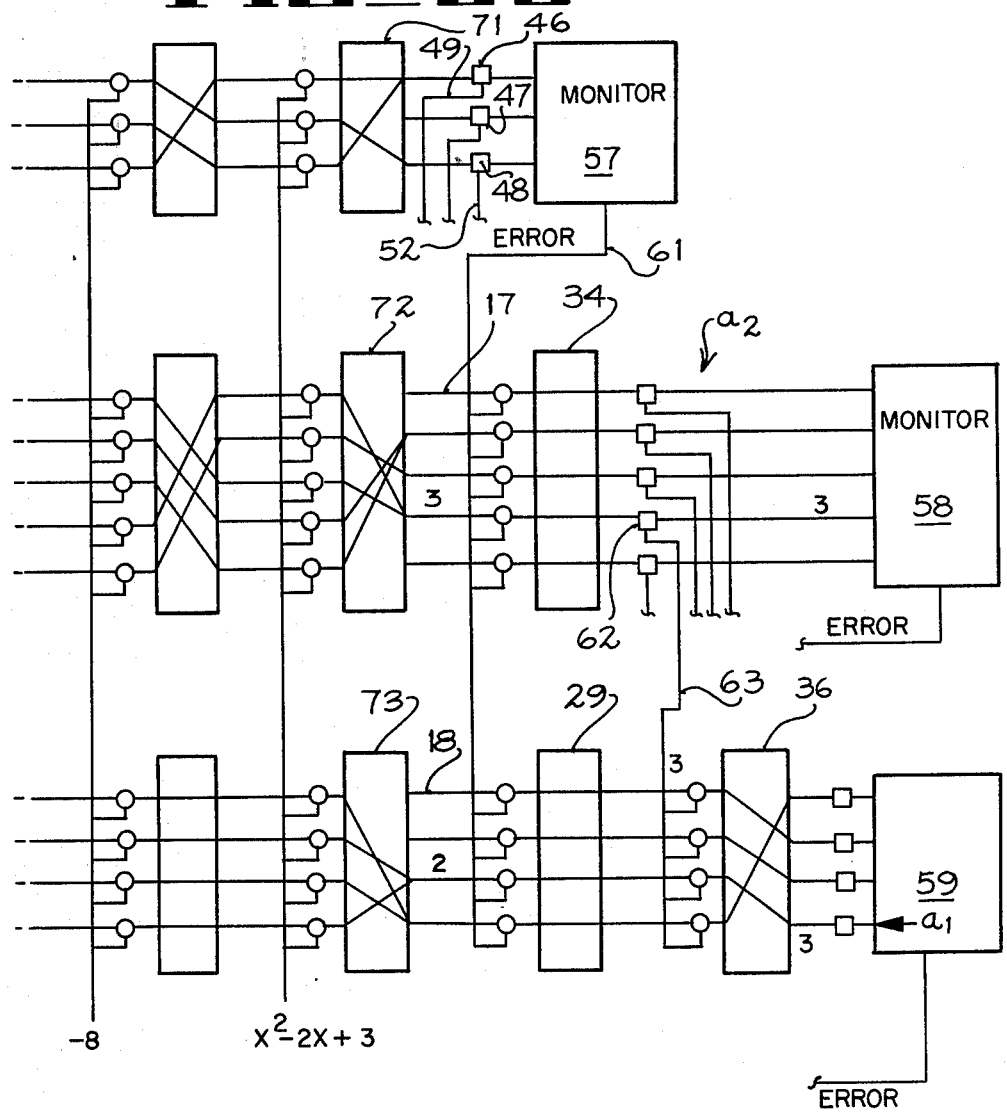

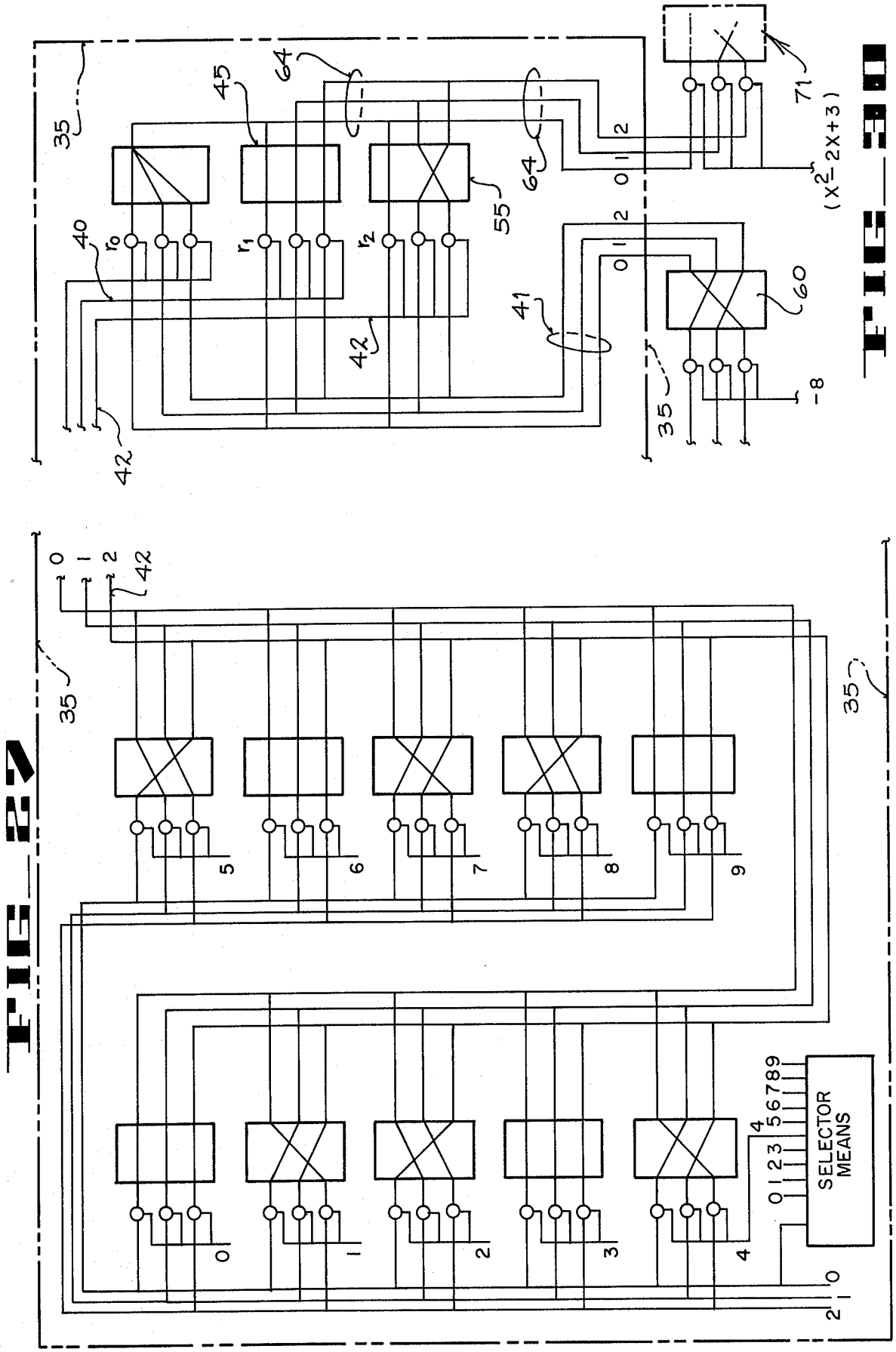

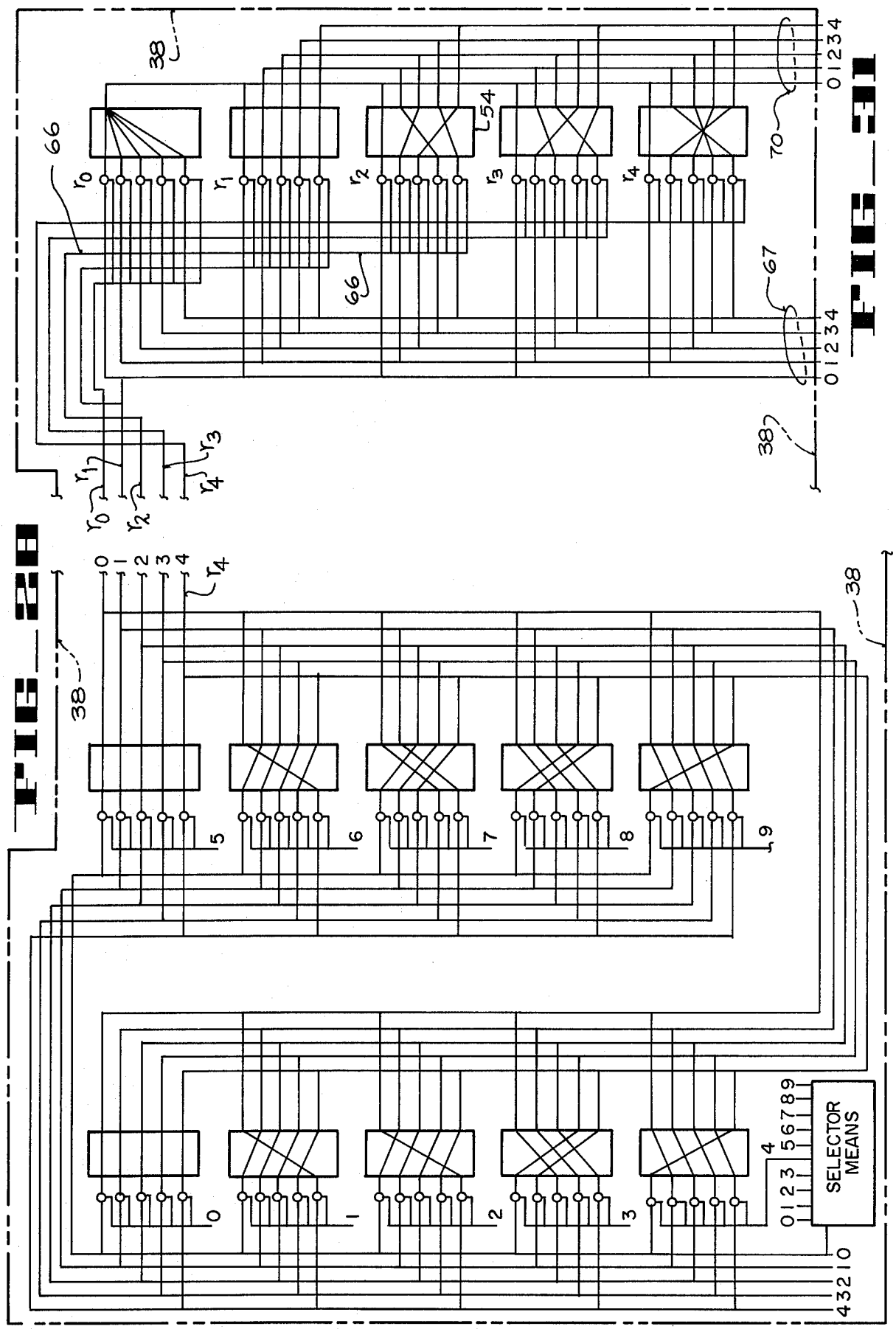

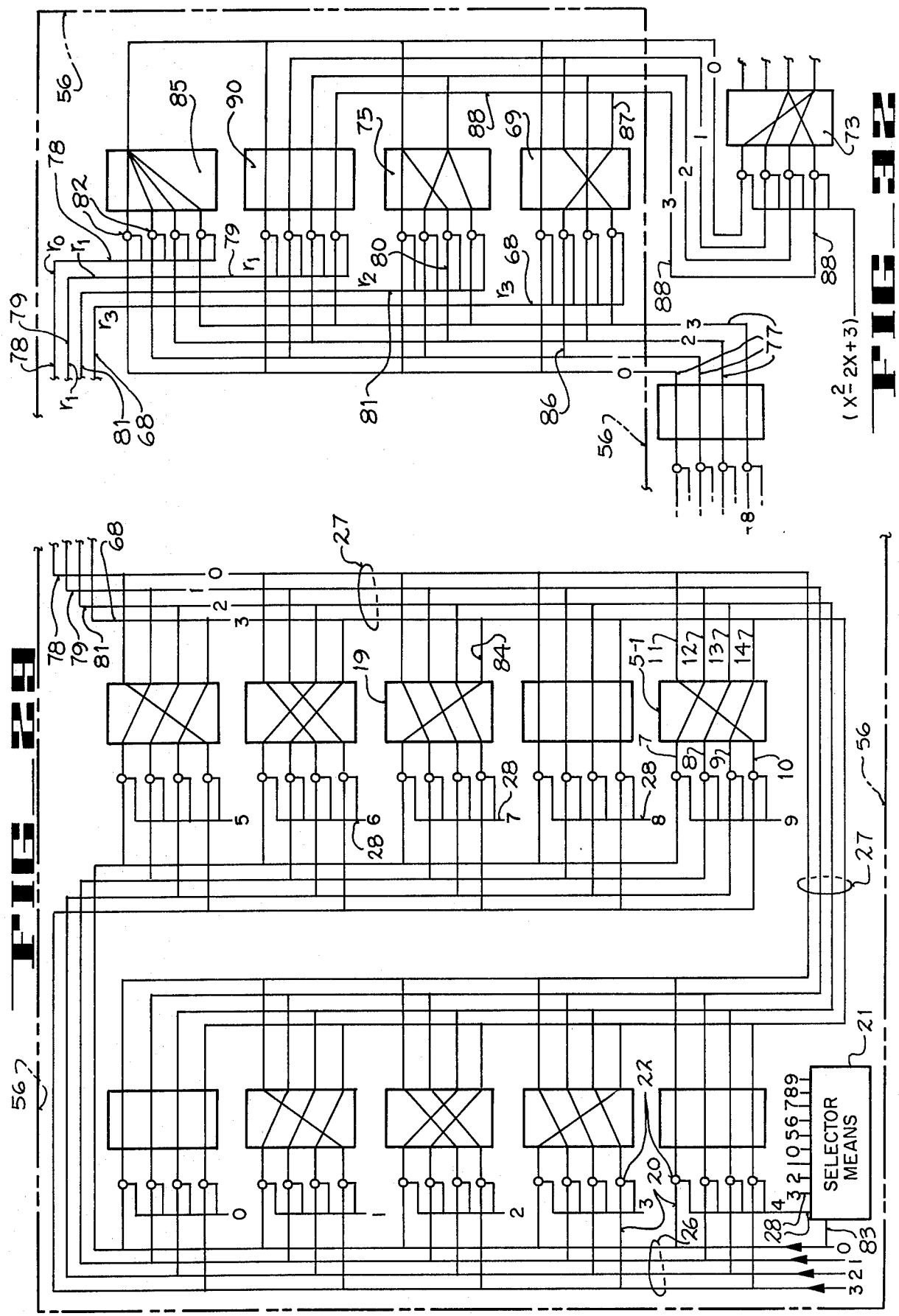

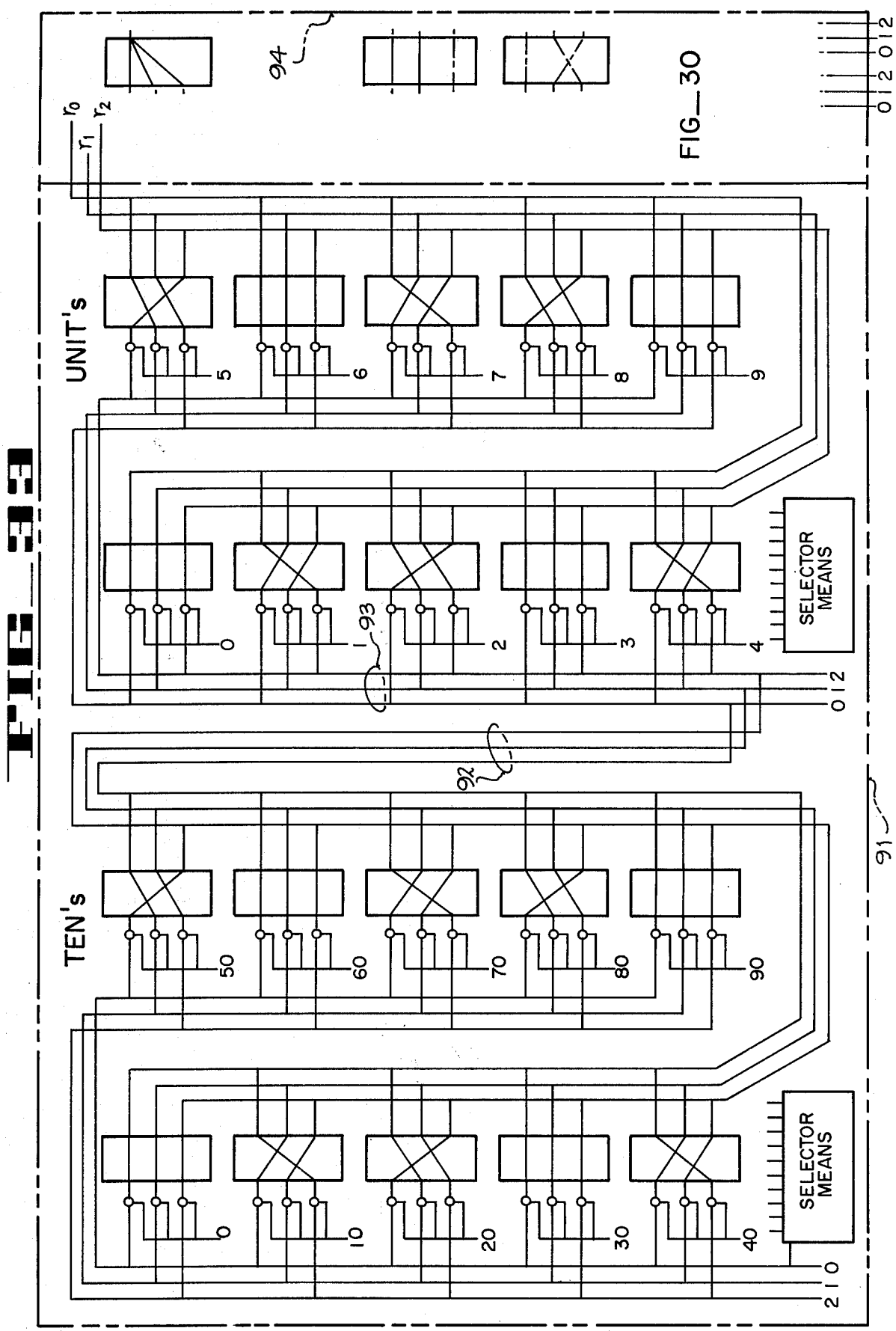

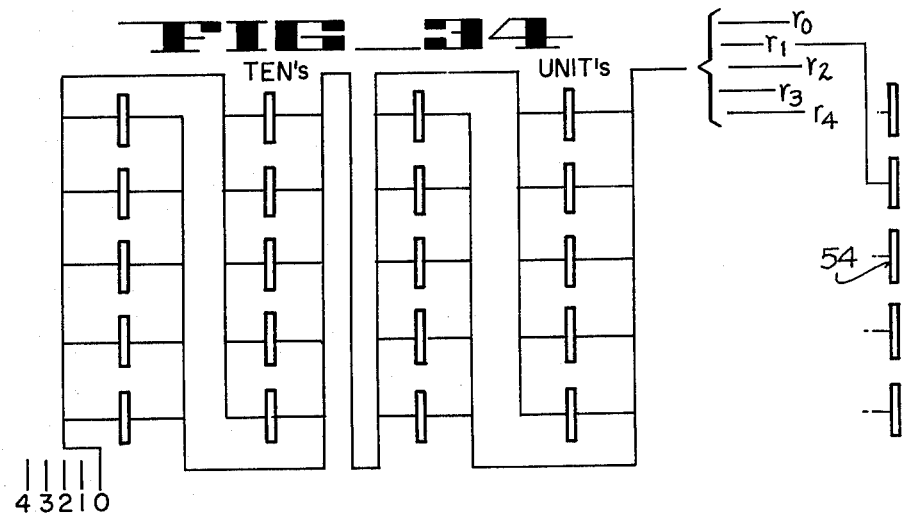
FIG_34
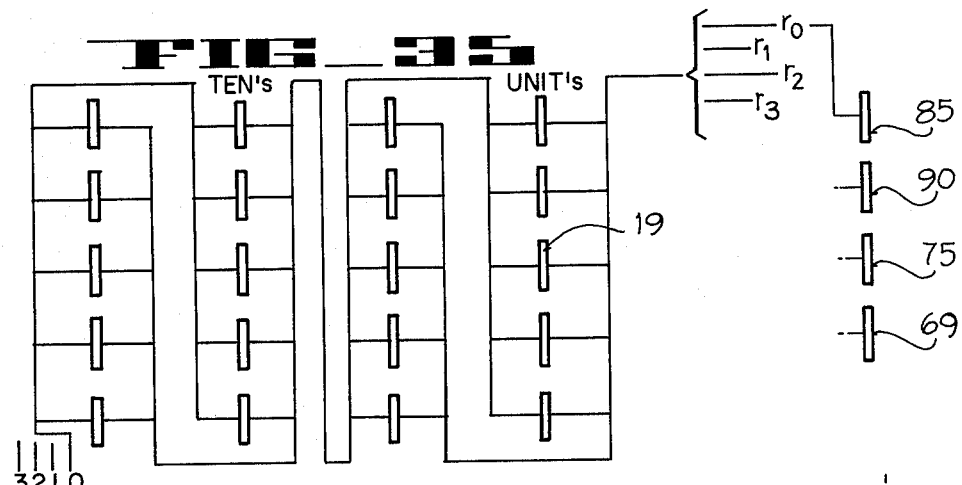
FIG_35
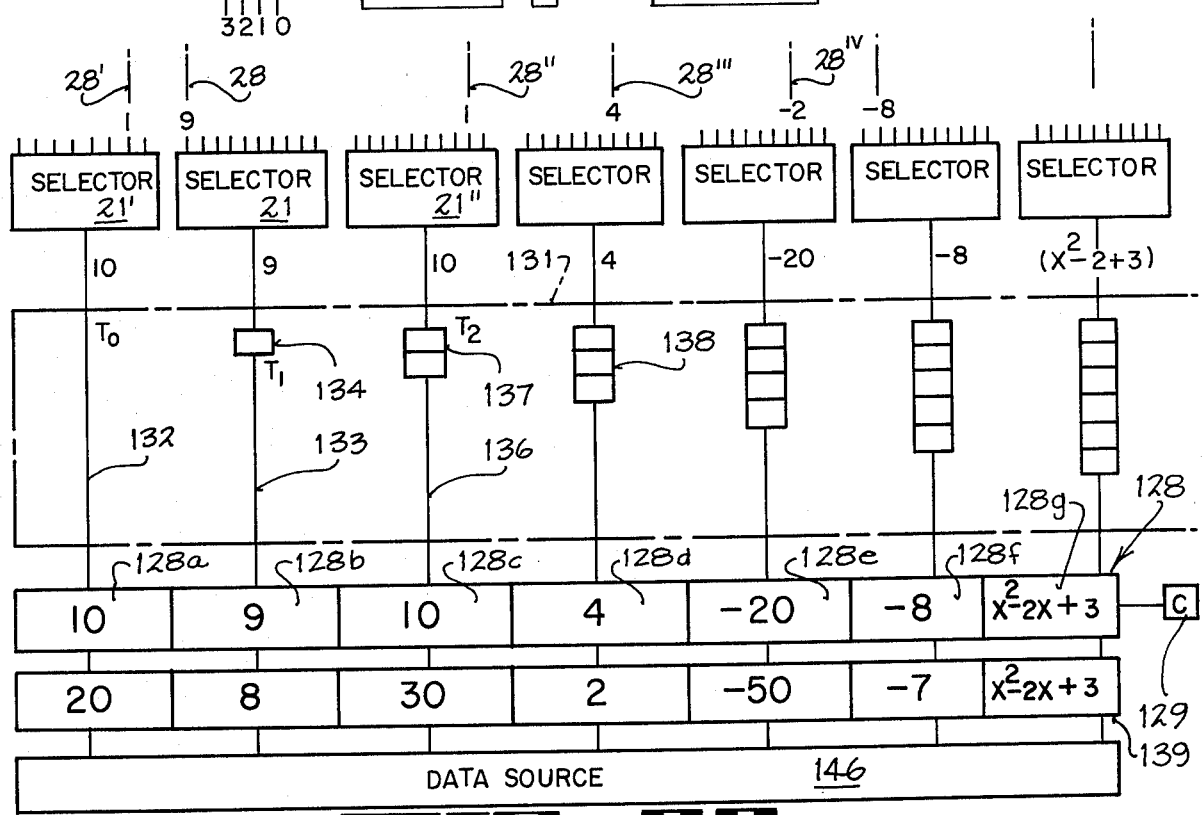
FIG_36

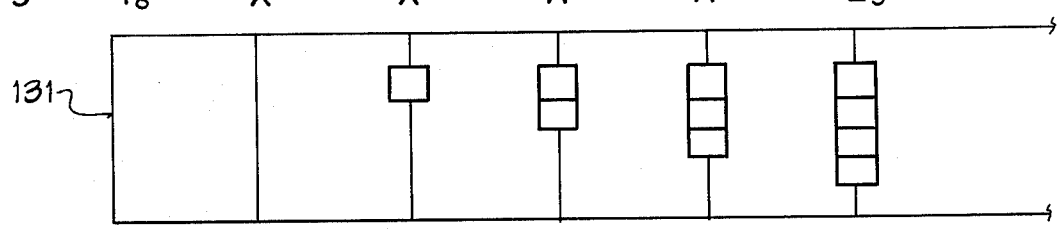
FIG_37
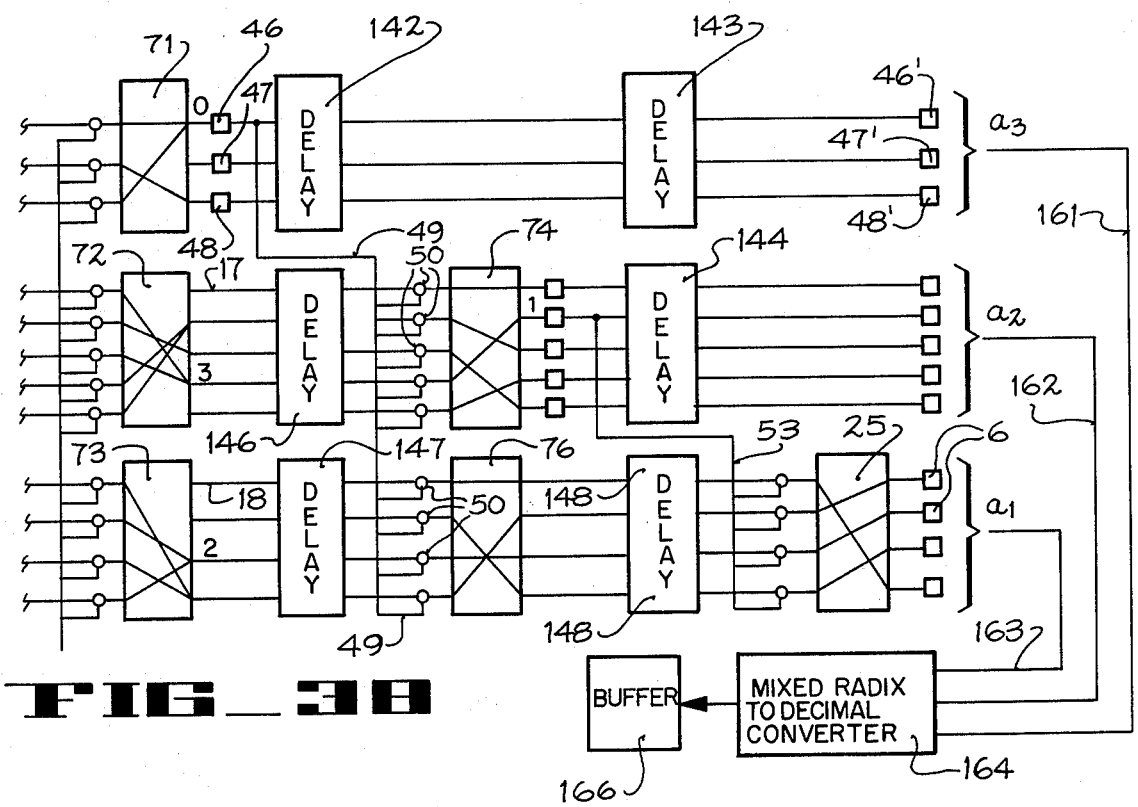
FIG_38

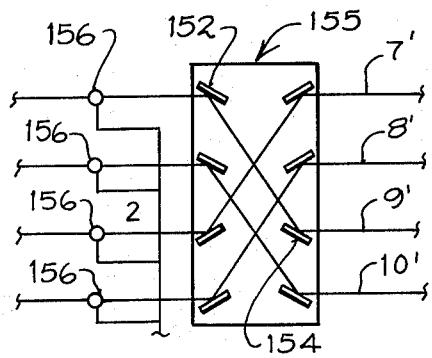
FIG_43
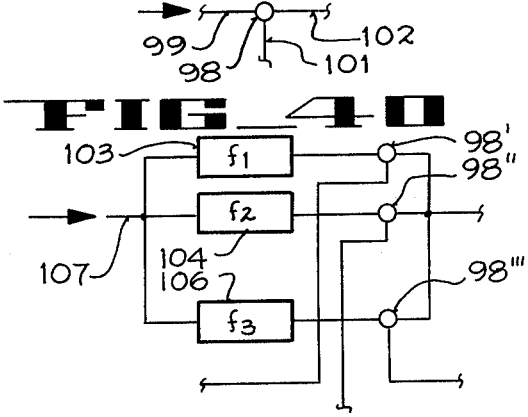
FIG_39
FIG_40
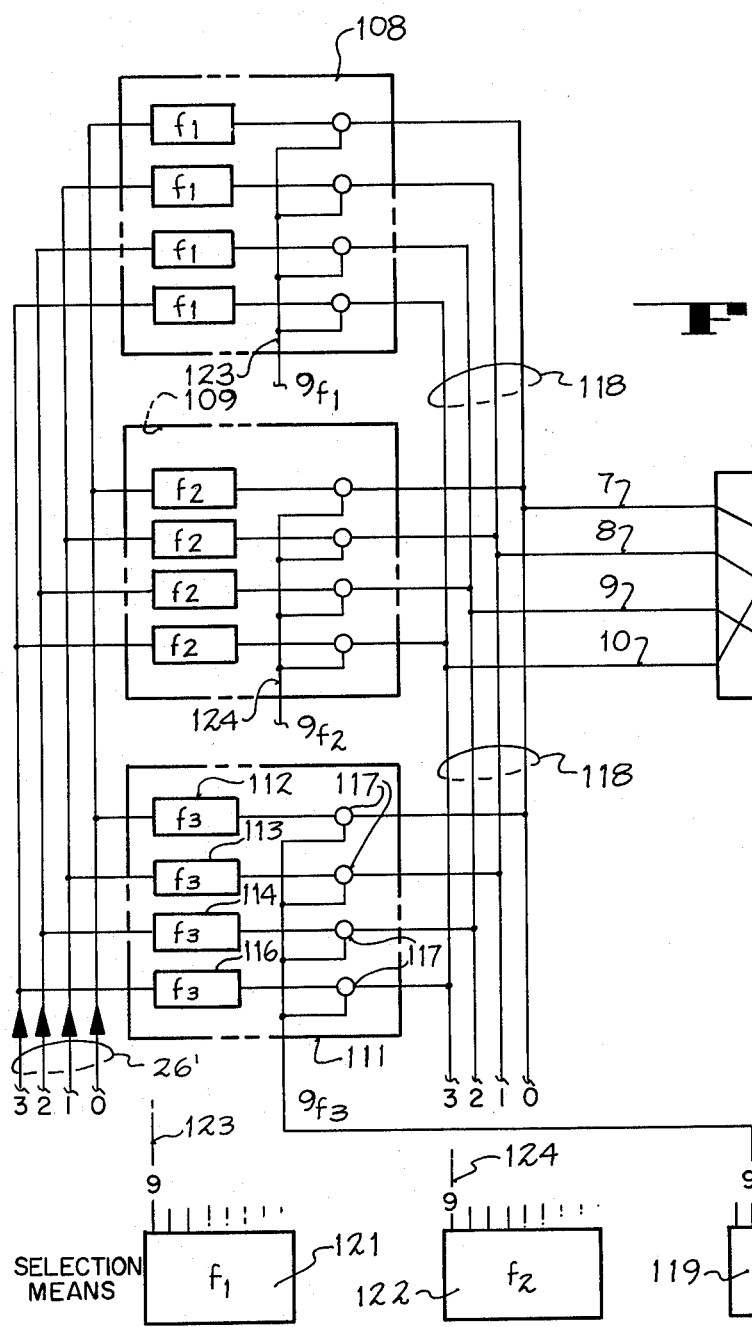
FIG_41

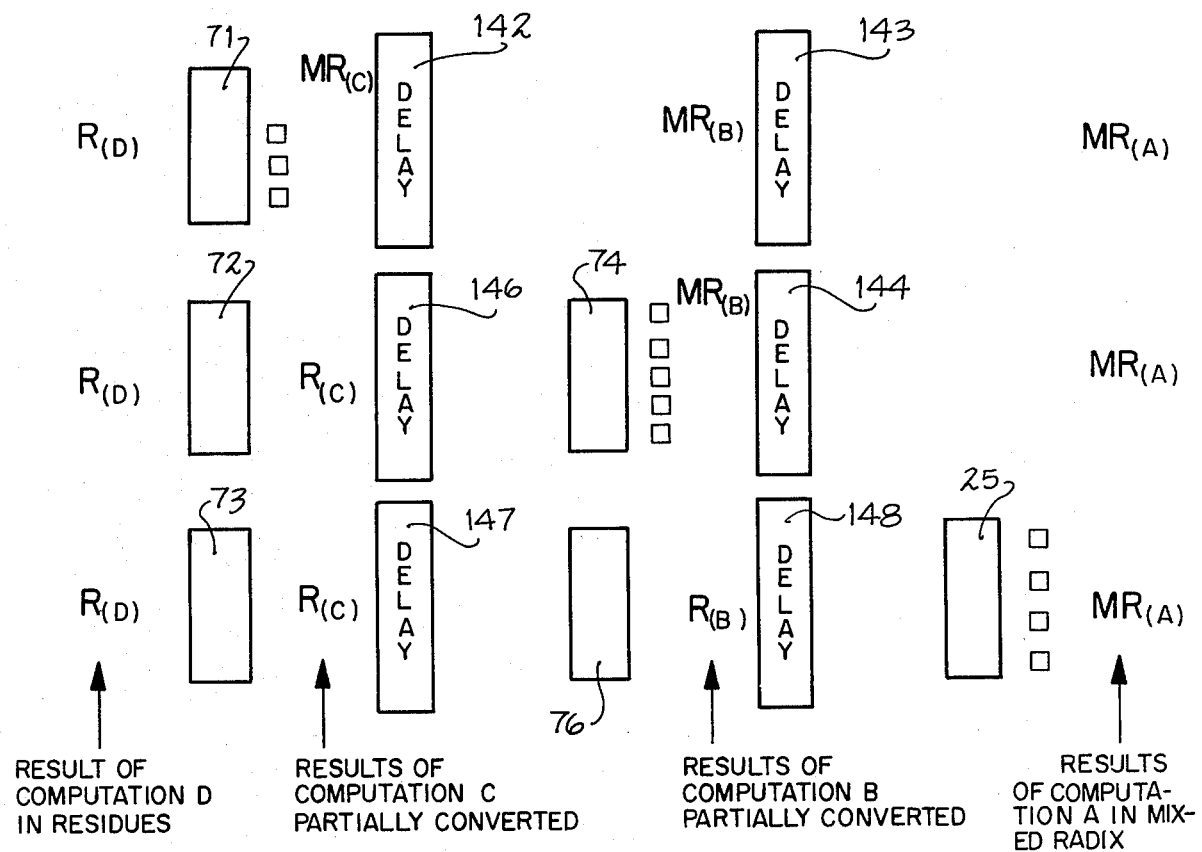
FIG_42

SYSTEM FOR PROCESSING ARITHMETIC INFORMATION USING RESIDUE ARITHMETIC

BACKGROUND OF THE INVENTION

This invention relates to a system for parallel processing of multiple operands using residue arithmetic notation and for decoding the results to provide a normal number, such as a decimal number.

At present most digital computers are based on a weighted number system such as binary which is implemented via Boolean techniques. The speed of calculations in a weighted number system is limited by the propagation of a carry. This and the fact that Boolean techniques require that a signal be detected and re-stimulated at each level of logic severely restricts the type of signals and phenomena which can be used.

The quest for speed has prompted the investigation of alternate number systems such as the residue system where addition, multiplication, and integer polynominals transforms can be accomplished in parallel without a carry. The residue system was first applied to computers in 1956 by M. Valach and A. Svobada in Czechoslovakia and independently by H. L. Garner in the United States.

One of the earliest papers is by H. L. Garner, et. al., "The Residue Number System," *IRE Trans. Electronic Computers*, Vol. EC-8, pp. 140–147, June 1959. A survey of the field is given in a book by N. S. Szabo and R. I. Tanaka, *Residue Arithmetic and Its Application to Computer Technology*, N.Y., McGraw-Hill, 1967.

Recent work has been devoted towards trying to cast residue arithmetic in to a form amenable to Boolean techniques so that conventional logic circuits can be used. Unfortunately, the potential benefits of this approach do not justify the additional complexity in hardware. There exists non-Boolean approaches which can bypass some of these constraints. The characteristics of the residue system can be mimiced by various physical phenomena. This is discussed in an article by the applicant, "The Implementation of a Residue Arithmetic Unit via Optical and Other Physical Phenomena," International Optical Computing Conference, 1975, Digest of Papers, N.Y., IEEE, Apr. 1975.

Some of the early work by Svobada and Valach involving electromechanical relays can also in retrospect be viewed as non-Boolean. A description can be found in "Computer Progress in Czechoslovakia II, The Numerical Systems of Residue Classes" in *Digital Information Processor*, Walter Hoffmann, ed., John Wiley & Sons, Inc., N.Y. 1962. More detail is given in A. Svobada and M. Valach, Operátorové obvody (Operational Circuits), Straje na Gpracovani Infomcici, Sbornik III, Nakl, ČSAV, Praka, 1955. Translation can be found: Information Processing Machines, National Technical Information Service, reference number AD757160. These references show the use of mathematical transformations, in pictorial form.

In spite of all these efforts the residue has remained a mere academic curiosity because the difficulties in converting back from such a system has offset most of the potential advantages. What has been lacking is an effective means to perform this conversion and the incorporation of such a mechanism into a complete processing system. Also lacking has been the ability to process in parallel, multiplexing and pipelining.

OBJECTS AND SUMMARY OF THE INVENTION

It is an object of the present invention to provide a system for processing arithmetic information using the residue number system to partition a calculation for parallel processing.

It is another object of the invention to provide a system for processing arithmetic information using the residue number system in which the information is pipelined for processing in rapid sequence.

It is a further object of the present invention to provide a system for processing arithmetic information in the residue number system with a plurality of operands and operations.

It is a further object of the present invention to provide a system for processing arithmetic information using the residue number system in which the information is multiplexed for simultaneously processing a plurality of information signals.

It is still a further object of the present invention to provide a system for processing arithmetic information in which errors are detected and corrected.

It is another object of the present invention to provide a reliable system for processing arithmetic information in the residue number system.

It is another object of the present invention to provide a processing system in which the arithmetic information is pipelined and multiplexed.

It is another object of the invention to provide a system in which the signals representing the arithmetic information can take various forms.

It is a further object of the present invention to provide a system for processing arithmetic information in which the processing operations required for implementation need not be Boolean and the number of detections of signals be reduced and conveniently deferred allowing a greater range of phenomena to be used.

In general a system for processing arithmetic information using a residue number system having a plurality of moduli comprises a plurality of processing segments, one for each modulus. Each segment includes a plurality of processing stages. Each processing stage further includes at least one map means having input states and output states representing the same residue numbers and including one state for each residue number thereof. The output states are related to the input states by a relationship defined as MOD (P (input number) $m_i$) where P is an integer polynomial, $m_i$ is the modulus of the segment, and "input number" represents each of the residue digits associated with the modulus of the segment. Means for routing the output of one map to the related input of the next map serves to advance the computation.

BRIEF DESCRIPTION OF THE DRAWINGS

FIG. 1 shows a shematic diagram of a system according to the invention;

FIG. 2 shows a schematic diagram of that portion of the invention shown in FIG. 1 employed for encoding a digit between 0 and 9 for modulus 4 according to the invention;

FIGS. 3, 4 and 5 show computations in residue notation for addition, subtraction and multiplication;

FIG. 6 shows the derivation of a map for the polynomial transform $x^2 - 2x + 3$;

FIG. 7 shows a table of relationships representative of the derivation obtained from FIG. 6;

FIG. 8 shows the procedural steps in deriving coefficients for mixed radix representation of a number otherwise represented in residue notation;

FIG. 9 shows the derivation of input and output relationships for a map for the polynomial transform $P_{10}(x) = x + 10$ for constructing a map for the numeral 10;

FIG. 10 shows a table of the relationships of FIG. 9;

FIG. 11 shows the derivation of input and output relationships for a map for the polynomial transform $P_9(x) = x + 9$ for constructing a map representative of the numeral 9;

FIG. 12 shows a table of the relationships of FIG. 11;

FIG. 13A shows the derivation of input and output relationships for a map representative of the numeral 4;

FIG. 13 shows a table of the relationships of FIG. 13A;

FIG. 14 shows an assembly of four tables taken from FIGS. 10, 12, 10, and 13 respectively for illustration of a computation by the system;

FIG. 15 shows a diagrammatic physical representation of maps and connections therebetween derived from the tables shown in FIG. 14;

FIG. 16 shows a derivation of input and output relationships for a map for modulus 3 for numeral $-20$ using the polynomial transform $P(x) = x + [M_i - \text{MOD } (d^*w, m_i)]$;

FIGS. 17 and 18 represent derivations similar to those of FIG. 16 for representation of numeral $-20$ for moduli 5 and 4;

FIGS. 19, 20 and 21 represent derivations for the value $-8$ for each of the moduli 3, 5, 4 respectively;

FIG. 22 shows two tables with the first being for $-20$ and the second being for $-8$, the first table employing the results derived by FIGS. 16 through 18 and the second table employing the results derived from FIGS. 19 through 21;

FIG. 23 shows the same tables as shown in FIG. 22 but employing arrows positioned as inputs to the tables for purposes of explanation;

FIG. 24 shows an arrangement of similar tables organized into columns and rows wherein each row represents a modulus and each column a stage of computation;

FIG. 25 shows a schematic diagram of a system according to the invention for automatically correcting and eliminating errors so as to cause the system to be self-correcting;

FIGS. 27, 28 and 29 each show a schematic diagram of means for encoding a decimal number into residue with respect to moduli 3, 5, 4 respectively to be supplied to multiplying means as shown in FIGS. 30, 31 and 32 respectively;

FIGS. 33, 34 and 35 each show a diagrammatic view of a system for encoding both first and second order decimal digits into residue notation and for supplying same to a residue multiplier relative to moduli 3, 5 and 4 respectively;

FIG. 36 shows a diagram for explanation of means for "pipelining" information through the system as shown in FIG. 38;

FIG. 37 shows charts for further explanation of the "pipelining" system shown in FIG. 38;

FIG. 38 shows a schematic diagram of a "pipelining" system, according to the invention;

FIG. 39 shows a diagram of a modulator unit for purposes of explanation;

FIG. 40 shows a unit for replacing the modulator of FIG. 39 for purposes of multiplexing a plurality of different signals through the system simultaneously;

FIG. 41 shows a schematic diagram of a multiplexing system, according to the invention;

FIG. 42 shows a diagram useful in the explanation of the pipelining decoder system according to FIG. 38;

FIG. 43 shows a diagram of another embodiment according to the invention;

DESCRIPTION OF PREFERRED EMBODIMENTS

Figure 26:
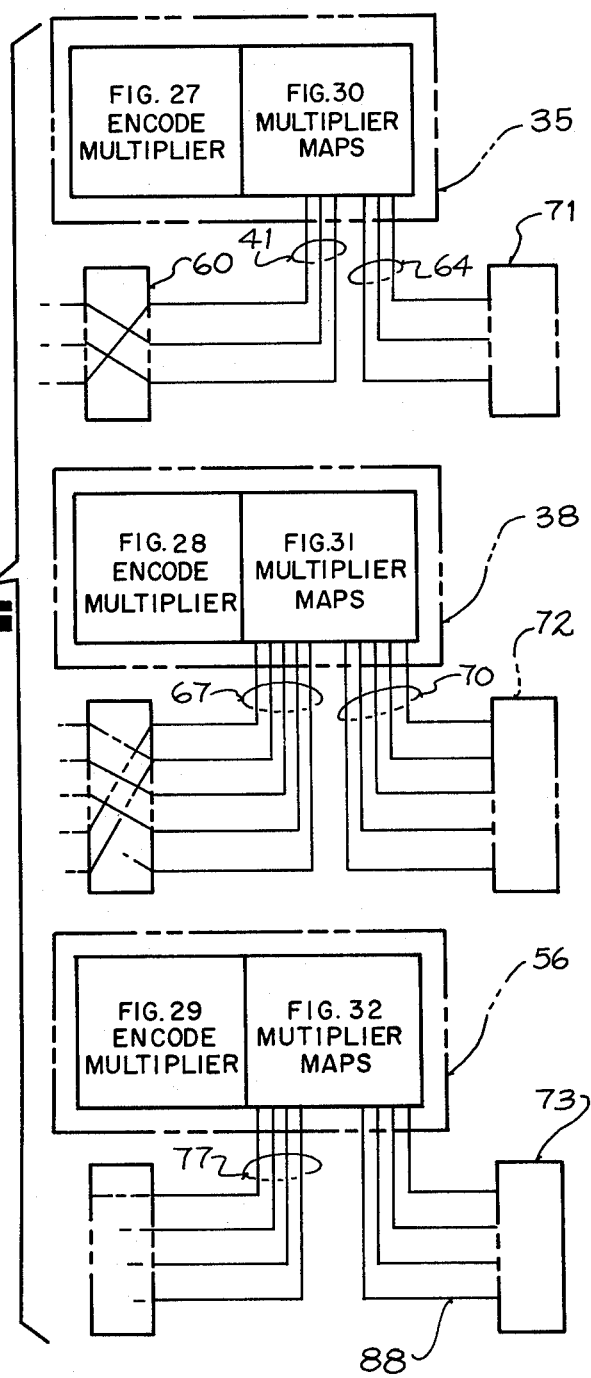
FIG. 26 shows in diagram form an overall arrangement of views associated with encoding a multiplier for incorporation into each modulus row for multiplying the residue thereof.

An understanding of the invention may best be had by reference to FIG. 1 of the drawings which shows an example of a system for processing arithmetic information. Signals from sources such as 31, 32 and 33 are routed through various maps such as 5, 5-1 and 5-2 (for source 33) and eventually to a detector such as 6. The maps associate a given input signal with a given output signal. Depending on the computation desired, the signals are routed variously through selected maps. Each row of maps represents a modular segment of the desired computation. The segments are completely independent of one another until they are decoded. In decoding, the result of a first segment is detected and used to influence the next remaining undetected segments. This process is repeated until all the segments have been detected.

The maps shown in FIG. 1 are associated with the computation of $f(x) = x^2 - 2x + 3$ where $x = 19 + 14 - 28$. There is provided a plurality of columns, one for each number, digit or polynomial. In FIG. 1 the maps shown are those selected from a plurality by suitable modulators to be described. For example, map 5-1 is selected from the plurality shown in FIG. 2. Input and output lines 7, 8, 9, 10, 11, 12, 13 and 14 are common in both figures. Map 5-1 was selected since it is the map associated with the digit 9 in the units place of the first number 19 in the desired computation. Modulators such as 4 are used to route the signal through the various maps by distinguishing or diffrentiating the signal passing through various maps from the signals in other maps. A detector such as 6 as described further below serves to detect the distinguished signal from among the others. To represent more numbers, digits, or polynomial transforms more columns can be added. To increase the range of the system more modular segments represented by more rows are added or the size of the moduli of the segments can be increased.

By selecting the maps associated with various calculations in a rapid, predetermined sequence the system may be "pipelined". Thus, after a given signal has passed a modulator, the modulator can then prepare to route the next signal representing another computation. This process is applied to all the modulators. This pipelining can be done so long as the propagation time of the signal from modulator to modulator is greater than the selection time of the modulator. In the case of decoding upon detection of a segment the signals in the remaining segments are delayed long enough to allow activation of modulators in the remaining segments.

The system can multiplex several computations concurrently by using different sets of modulators wherein each set will only effect a certain type of signal. By using these modulators different types of signals representing different computations may be independently routed through the system simultaneously. It has been observed that errors in such a system usually are associated with faulty propagation of the signals in the system. Such errors can usually be reflected by the condition of the signal as sensed by monitors. Abnormalities at this point can be used to exclude the associated segment from the decoding process. The abnormal condition can be local to a given input or output, temporary, permanent, or in several segments simultaneously. The present system automatically reconfigures itself to preserve correctness at the expense of range.

To obtain an understanding of the system as well as the design of those portions of the system entitled "maps", the underlying mathematics of a residue arithmetic system can best be understood by reference to FIGS. 3 - 6. The residue number system is based on various moduli. These moduli need only be pair-wise relatively prime and any number of moduli can be employed. For example, if the moduli consist of the numbers 3, 5, and 4 each pair of these numbers are prime with respect to each other. The range of such a system (i.e. the maximum calculatable values) lies between 0 and $M - 1$ where M is the product of all the moduli. If negative numbers are represented implicitly then the range is from $-M/2$ to $M/2 - 1$ when M is even. For simplicity of discussion, 3, 5, and 4 will be used for moduli and this will give a range from 0 to 59 or from $-30$ to 29 if negative numbers are represented.

Residue addition is demonstrated in FIG. 3 where the number "19" is expressed as the three residue numbers 1, 4, 3. These are each remainders resulting from dividing 19 modulus 3 (remainder of 1); dividing 19 by modulus 5 (remainder of 4) etc. "14" is converted in similar manner to residue numbers 2, 4, 2. For adding in the residue system each column is added and the sum is represented as merely the remainder after division of the sum of the column by the modulus of that column. Thus, for the first column $1 + 2$ is 3 but when divided by modulus 3 results in a residue "sum" of 0. The other columns are processed in a similar manner to provide residue numbers 0, 3, 1 repsectively. In order to prove the foregoing residue notation as being representative of number 33, numeral 33 can itself be represented as residue 0, 3, 1 by dividing 33 by the same moduli as follows: dividing 33 by 3 leaves no remainder; dividing 33 by 5 leaves a remainder of 3; and dividing 33 by 4 leaves a remainder of 1. Hence, residue notation 0, 3, 1 represents 33.

Means for converting a number represented in residue notation to a decimal number or other more normal or usual number notation are described further below. It should be noted that the processing associated with each modulus is independent of the others and can thus be operated in parallel. The parallel processing also applies to subtraction, multiplication and polynomial transforms.

Residue subtraction is demonstrated in FIG. 4 as follows. The subtrahend is first converted to residue notation and then the complement of each residue digit (with respect to its modulus) is added to an associated digit of the minuend in residue notation. For example, in the middle column in FIG. 4 a residue of 3 is added to a residue of 2, which is the complement of 3 for mod (28, 5), whereby the sum is 5. Dividing this sum by 5 leaves no remainder. The residue notation 2, 0, 1 can easily be proven correct by converting the decimal difference between 33 and 28 (namely 5) to its residue notation using the moduli 3, 5, 4.

Residue multiplication is demonstrated in FIG. 5 where each number to be multiplied is converted to residue (as in the case of residue addition). Each column of residue digits is then multiplied separately and their individual products are expressed as a residue with respect to the modulus of the associated column.

Integer polynomial transform relationships using derivation techniques are shown in FIG. 6. For the polynomial transform represented by the equation $P(x) = x^2 - 2x \times 3$, tables are first constructed for each of the moduli by substituting into the polynomial all of the possible residue digits forming the input state for each modulus. The answers are then expressed as the remainder after division by the associated modulus. (The expression "mod(3, 5)" is read to mean numeral 3 divided by 5 and this provides a residue or remainder of 3). The results are summarized by the simplified table shown in FIG. 7.

The simplified table of FIG. 7 merely associates the proper residue (or remainder) for each of the possible residue digits with respect to each modulus using the tables of FIG. 6. Thus, residue digits 2, 0, 1 for moduli 3, 5, 4 respectively generate residue outputs of 0, 3, 2 (as shown in both the tables of FIG. 6 and the simplified table of FIG. 7). In FIG. 7 the short arrows merely indicate the residue input digits 2, 0, 1.

As an example of the use of the tables in FIG. 6 in solving the polynomial transform equation related thereto (i.e. $P(x) = x^2 - 2x + 3$) assume that the unknown quantity x is a 5 so that it is desired to find P(5). The numeral 5 is first converted into residue form using moduli 3, 5, 4 to provide the residue digits 2, 0, 1 by dividing 5 successively by each of the moduli 3, 5, 4 and noting the remainder in each case. This residue notation is then "translated" by substituting each of the residue digits 2, 0, 1 respectively into each of the three polynomial transform possibilities P(2) for modulus 3; P(0) for modulus 5; and P(1) for modulus 4. P(2) for modulus 3 provides the residue notation 0; P(0) provides the residue notation 3 for mod 5; and P(1) for mod 4 provides a residue of 2.

Thus, the result of first converting numeral 5 into residue notation and then translating that residue notation by means of the tables provides a residue of 0 3 2 which converts back to 18 decimal. As proof, numeral 18 is represented by 0 3 2. Further, substituting 5 in $x^2 - 2x + 3$ becomes 18 as above. This polynomial transform technique provides the relationships used to generate the "maps" for encoding, processing, and decoding which are used in the system all as described further below.

Residue encoding, addition, and subtraction may each be accomplished with polynomial transforms. A number may be broken up and the contribution of each radix place considered independently. Thus, the numeral 19 can be viewed as $10 + 9$. The addition of 10 can be considered as the transform of $P_{10}(x) = x + 10$. Similarly, the addition of 9 is represented by the transform of $P_9(x) = x + 9$. Tables as shown in FIGS. 9 - 12 can be constructed for each of these two polynomial transforms.

For the polynomial transform $P_{10}(x) = x + 10$ the tables in FIGS. 9 and 10 have been constructed in the manner as was done above for $P(x) = x^2 - 2x + 3$ as shown in FIG. 6. For the polynomial transform $P_9(x) = x + 9$, similar tables are shown in FIGS. 11 and 12. For the transform of FIGS. 9 and 10 [$P_{10}(x) = x + 10$] and assuming $x = 0$ the resulting residue notation for $P_{10}(0)$ is 1, 0, 2 (using moduli 3, 5, 4). In adding $10 + 9$ the foregoing residue notations 1, 0, 2 individually can be used as inputs to the chart of FIG. 12. In this way the output 1, 4, 3 from the chart of FIG. 12 will represent (in residues) the numeral 19. Thus, the inputs are further translated by the polynomial transform of FIGS. 11 and 12 [$P_0(x) = x + 9$] to provide the residue notation 1, 4, 3.

The last named translation is accomplished by using the residue digit 1 as an input to the MOD 3 column of the chart of FIG. 12 and employing the residue digit 1 of the same column of the chart as the output. The residue digit 0 is used in the same chart with modulus 5 to provide the residue 4 as an output. Similarly, the last residue number input is a 2 employed in association with modulus 4 to provide a residue output of 3 (as shown). Hence, the result of translating 1, 0, 2 through the chart of FIG. 12 becomes 1, 4, 3 in residue notation which serves to add the equivalent of numeral 9 to that of numeral 10. The contents of additional radix places can be handled in a similar manner.

In general, to encode a particular digit of a number into a given modulus, the polynomial $P(x) = \text{MOD} (x + d * w, m_i)$ is used where d is the contents of a particular digit; w is the weighting factor of the digit; x is any one of the possible residue input digits; * represents a multiplication symbol. The asterisk (*) is used as a multiplication symbol for the usual "x" (which in this instance would be ambiguous) throughout this and the following description; and $m_i$ is the modulus. For numeral 20, using:

| $m_i = 3$ | $m_i = 5$ |
|---|---|
| P(O) = MOD (0 + 2 * 10, 3) = 2 | P(O) = MOD (0 + 2 * 10, 5) = 0 |
| | P(1) = MOD (1 + 20, 5) = 1 |
| P(1) = MOD (1 + 20, 3) = 0 | P(2) = MOD (2 + 20, 5) = 2 |
| | P(3) = MOD (23, 5) = 3 |
| P(2) = MOD (22, 3) = 1 | P(4) = MOD (24, 5) = 4 |

To perform the addition shown in FIG. 3 where 14 is added to 19, tables for encoding 14 are constructed. Considering that 14 can be viewed as 10 + 4, a duplicate of the table of FIG. 10 can be employed for the numeral 10. A table for 4 is shown in FIG. 13. By cascading these tables and assuming an initial input of $x = 0$ the combined encoding and addition is preformed.

The foregoing procedure provides an output from the chart of FIG. 13 in residue notation of 2, 4, 2 which, upon checking with FIG. 3 constitutes the breakdown for numeral 14 in residue notation.

In order to add 14 to 19 the tables for (decimal) numerals 10, 9, 10, 4 are cascaded as shown in FIG. 14 whereby the output from one chart constitutes the input to the next succeeding chart.

As noted above, when the polynomial transform $P_{10}(0)$ is encoded in the left hand chart the result is 1, 0, 2 for moduli 3, 5, 4 respectively. These results are identified by the square block drawn around each of the numbers. These residue numbers constitute the inputs to the next stage for numeral 9 and its associated chart derived from a polynomial transform associated therewith. Accordingly, the first (MOD 3) input is at digit 1 (MOD 3 input is associated with the shortest of three arrows shown). The second (MOD 5) input is at digit 0 (associated with the intermediate arrow) and the third (MOD 4) input is at digit 2 (where the longest of the three arrows is indicated). Accordingly, the decoding of numeral 19 has at this point been translated to residue notation of 1, 4, 3 as appearing in FIG. 3.

Residue notations 1, 4, 3 form the inputs in parallel to the next stage wherein the MOD 3 input (residue 1) enters at the digit 1 level to provide a residue output of 2 for modulus 3. The MOD 5 input at digit level 4 provides a residue output of 4 for modulus 5 and the MOD 4 input at digit 3 provides a residue output of 1 for modulus 4. (Note that the charts are the same for 10 in both circumstances, i.e. where ten is part of 19 and of 14.)

While the inputs are described herein in sequence it should be readily evident that in the construction described further below the inputs preferably are supplied in parallel.

In FIG. 14, the output from the third stage is residue 2, 4, 1 and, accordingly, the associated input to the fourth stage at digit 2 provides residue 0 in the column for modulus 3; the input for modulus 5 at the digit 4 level provides a residue output of 3; and the input at digit 1 provides a residue output of 1 for modulus 4. Hence, at this point the summation of 10 + 9 + 10 + 4 provides an answer in residue notation of 0, 3, 1 which compares to the residue answer in FIG. 3.

Tables or charts as above representing any number of numbers may be cascaded in the same manner to the extent desired.

Provision of arrows of different lengths with the shortest arrow constituting the MOD 3 input; the intermediate length arrow representing the MOD 5 input; and the longest arrow representing the MOD 4 input constitutes a simple convention for the identification of inputs for each stage. A diagram of the resulting physical relationships appears in FIG. 15 where connecting lines provide the above identified relationships.

From inspection of FIG. 15 it is readily evident that none of the MOD 3 inputs relate or interconnect with any of the other inputs. Similarly, none of the MOD 5 nor MOD 4 inputs interconnect with others. Accordingly, if only the MOD 3 tables are employed the first four stages of the top row of tables shown in FIG. 24 is provided. Also, if only the MOD 5 tables are employed and disposed side by side the first four stages of the middle row of tables of FIG. 24 results, and from the MOD 4 tables of FIG. 14 four stages of the bottom row of tables of FIG. 24 is created.

Accordingly, it is readily evident that commencing with inputs of 1, 0, 2 (the initial inputs to FIG. 14 at the digit 0 level) the output of the fourth stage becomes 0, 3, 1 after adding 19 + 14 (as was shown in FIGS. 14 and 15) using an organization of relationships resembling the map structures shown in FIGS. 1 and 2 described further below.

Subtraction is accomplished by the addition of the complement of a number as now to be described with respect to FIG. 4 where an example of a subtraction problem is shown. In the example, the number 28 is subtracted from number 33 (the sum of the previous addition). Hence, the subtrahend 33 is first encoded into residue form using the moduli 3, 5, 4 to provide residue notation 0, 3, 1. The minuend, numeral 28, is then encoded into residue notation 1, 3, 0. Each of the residue numbers 1, 3, 0 is converted to its complement (relative to its associated modulus) to be added to the residue notation for numeral 33. Accordingly, the residue notation for modulus 3 becomes residue 2; for modulus 5 becomes residue 2; and for modulus 4 remains a 0. In this regard it is evident that the first 2 is the complement of the left hand digit 1 (with respect to modulus 3) since 2 + 1 = 3 with no remainder. In the second instance the complement of residue notation 3 for modulus 5 is a 2 since 2 + 3 = 5 with no remainder. In the case of modulus 4 a 0 is converted to its complement which might be assumed to be a 4 since 0 + 4 would then equal the modulus 4 however 4 modulus 4 is equal to 0.

The two-step procedure shown in FIG. 4 can be accomplished directly so that a number may be encoded directly into its complement by using the following polynomial transform: $P(x) = x + [m_i - \text{MOD}(d*w, m_i)]$ where $m_i$ is the modulus; $x$ is any one of the possible remainders associated with the same modulus; $d$ is the contents of a given digit; $w$ is the weighting factor of the digit such as units, 10s, 100s, etc.

Using the above polynomial transform and substituting appropriate information, the encoding relationships and tables for each modulus (3, 5, 4) can be constructed for both (−) 20 and (−) 8 as shown in FIGS. 16 through 18 and 19 through 21 respectively. In FIG. 22 the individual tables for each of the moduli 3, 5, 4 relative to −20 and −8 are merged to form two charts, one for encoding (−) 20 to its complement in residue notation and the other for (−) 8.

If all of the inputs for the three moduli 3, 5, 4 are entered at the 0 digit level it is evident that the output residue notation for each modulus will be 1, 0, 0 as shown. Remembering that the length of each input arrow represents the input position for the first, second or third modulus columns commencing from left, an entry into the second table is made at the digit 1 level for modulus 3 and at the digit 0 level for the moduli 5, 4. Accordingly, the conversion of −28 to its complement in residue notation is the residue notation 2, 2, 0 (as shown earlier in FIG. 4).

FIG. 23 employs the same charts as used in FIG. 22 but the inputs through the left hand chart are derived from the outputs (0, 3, 1) of FIGS. 14 and 15 and therefore represent the further introduction of subtraction of numeral 28 (FIGS. 22 or 23) from the sum of the addition of 19 + 14. Accordingly, at this stage the numeric representation of the problem would be as follows: 19 + 14 − 28

With reference to FIG. 23 the input is represented by the three arrows located at digit positions 0, 3, 1 as required by the output of FIGS. 14 and 15. Thus, the shortest arrow (associated with modulus 3) and located at the digit 0 position indicates that the subsequent input to the table for (−) 8 will be at the digit 1 level where it is shown. Similarly, the input for modulus 5 appears at the digit 3 level and the input for modulus 4 appears at the digit 1 level all as dictated by the output from the table for −20. From inspection of the −8 table it is evident that the output from that table will be in residue notation 2, 0, 1. For purposes of checking the result reference is made to FIGS. 3 and 4. In FIG. 3, numerals 19 and 14 were added together to provide 33 and in FIG. 4 the same 33 was used as the subtrahend from which numeral 28 was subtracted to provide numeral 5. Numeral 5 when broken down to residue notation as shown in FIG. 4 is represented by 2, 0, 1. Referring to the right hand table of FIG. 23 (where −28 has been "added" to the sum of 19 + 14) the output is 2, 0, 1 as in FIG. 4.

As noted in FIGS. 6 and 7 the polynomial transform $x^2 - 2x + 3$ provides the tables for moduli 3, 5, 4 as shown in FIG. 7. By disposing the tables of FIG. 7 one above the other they can be arranged as shown in column 7 of FIG. 24.

Means are provided as described further below for conversion of residue notation into a mixed radix system so as to provide for sign information or relative magnitude determination and for conversion from residue notation to a decimal number. The MOD function is needed for this conversion. MOD $(a,b)$ is defined as the remainder of $a$ divided by $b$.

It is known that to cast a number into a mixed radix form, such as defined by:

$$x = a_1(3*5) + a_2(3) + a_3$$

$a_3$ is first isolated; then $a_2$; then $a_1$. These isolation steps are accomplished as follows: (1) using the MOD function to extract the constant term of the equation. Thus, MOD $(x,3)$ leaves a remainder of $a_3$ relative to the above equation since 3 divided into $a_1(3*5)$ is 5 $a_1$ without remainder; and $a_2(3)$ divided by 3 is $a_2$ without remainder; but $a_3$ is not divisible by 3 whereby $a_3$ becomes isolated as the remainder of MOD$(x,3)$. Accordingly, $a_3$ becomes one of the mixed radix coefficients; secondly (2) the remainder $(a_3)$ is subtracted from the above equation to leave $15 a_1 + 3 a_2$; and finally (3) is to divide that which is left (following subtraction) by the modulus which was used to isolate $a_3$ (i.e. numeral 3) and in this way provide an equation for $x'$ for deriving the next coefficient. Thereafter, the equation for $x'$ is treated in the same way by repeating the first three steps but now using the equation for $x'$ and using a different modulus such as 5.

The above can be summarized numerically in the following sequence:

|  |  |
|---|---|
|  | $x = 15a_1 + 3a_2 + a_3$ |
| (1) MOD | MOD $(x,3) = 5a_1 + a_2$ remainder $a_3$ |
| (2) Subtract | $x = 15a_1 + 3a_2 + a_3 - a_3$ |
| new x | $x' = (15a_1 + 3a_2)$ |
| (3) divide | $x' = 5a_1 + a_2$ |
| (4) MOD | MOD$(x',5) = a_1$ remainder $a_2$ |
| (5) subtract | $a_2$ |
| new x | $x'' = 5a_1$ |

As disclosed herein a number in residue notation is converted to a mixed radix form by a process which is very similar to the foregoing. The differences are that the residue digits already represent the result of the MOD operation and that division by a number is accomplished using multiplication by the modular multiplicative inverse of such number.

In order to derive the multiplicative inverse of a given residue number the following formula is employed:

MOD $(z*m_n, m_i) = 1$ (i.e. remainder is 1); where $m_i$ is one of the moduli 5 or 4 (in the above example); $m_n$ is the digit being used as a divisor (3 and 5 in the above example); the asterisk is a symbol for multiplication; and z constitutes the smallest unknown for which MOD $(z*m_n, m_i) = 1$ is true. The unknown z can best be solved with reference to the following tables:

| For: MOD(z*3,5) = 1 | |
|---|---|
| z | remainder |
| 0 | 0 |
| 1 | 3 |
| 2 | 1 |

Hence, when z is 2 the equation is valid for modulus 5 with a divisor of 3.

| For: MOD(z*3,4) = 1 | |
| --- | --- |
| z | remainder |
| 0 | 0 |
| 1 | 3 |
| 2 | 2 |
| 3 | 1 |

Hence, when z is 3 the equation is valid for modulus 4 with a divisor of 3.

| For: MOD(z*5,4) = 1 | |
| --- | --- |
| z | remainder |
| 0 | 0 |
| 1 | 1 |

Hence, when z is 1 the equation is valid for modulus 4 with a divisor of 5.

Summarizing, the equations each require a remainder of 1 to be valid whereby the multiplicative inverse of 3 with respect to MOD 5 is 2; and the multiplicative inverse of 3 with respect to MOD 4 is 3. Thus multiplying a residue number by 2, 3, would be equivalent to dividing that number by 3.

In accordance with the above technique, in order to express 0, 3, 2 in the mixed radix form of:

$$a_1(3*5) + a_2(3) + a_3$$

and with reference to the steps in FIG. 8, MOD $(x,3)$ is initially derived as described above. This information is already shown to be 0 since the digit 0 appears in line 1 of FIG. 8 associated with modulus 3. The second of the above steps is to subtract $a_3$ (i.e. 0 in residue notation) from the previous result. 0 in residue form is 0, 0, 0. Accordingly, subtraction of 0 from residue notation 0, 3, 2 is shown at line 2 with the result appearing in line 3, namely 0, 3, 2. The first residue digit 0 of the result appearing on line 3 of FIG. 8 indicates that the mixed radix number is exactly divisible by 3.

By "dividing" the result on line 3, FIG. 8, by the modulus 3 to provide a subsequent equation for deriving the next coefficient the result of the first subtraction appearing at line 3 is multiplied by the multiplicative inverse of modulus 3, which for modulus 5 is 2 as derived above and for modulus 4 is 3, whereby the intermediate result appearing at line 5 in residue notation is 1, 2.

The residue digit for modulus 5 is thus, $a_2 = 1$. Subtracting $a_2$ (which in residue is 1, 1) at line 6 in the columns associated with moduli 5, 4 respectively, provides a result of 0, 1 in line 7. Hence, the number is exactly divisible by 5. The result at line 7 when "divided" by 5 (i.e. multiplied by the multiplicative inverse of 5 for modulus 4 which is 1) leaves a remainder of 1 at line 9. Hence, $a_1 = 1$.

The coefficients ($a_1 = 1$; $a_2 = 1$; $a_3 = 0$) thus derived represent a number in the mixed radix system corresponding to the number represented by 0, 3, 2 in residue notation (for moduli 3, 5, 4) at the output from the seventh column of FIG. 24, i.e. immediately prior to entry of the decoding section 39.

Since subtraction (as shown in FIG. 4) can be accomplished by using polynomial transforms and multiplication (as shown in FIG. 5), can also be accomplished by polynomial transforms, a single table can be constructed to accomplish both the functions of subtraction and multiplication.

To provide a combination of subtraction, i.e. $(a - b)$ with a multiplication step i.e. $(a - b)c$ two operations are combined into a single expression. In the present instance to combine steps (2) and (3) (i.e. subtraction and "division") the following polynomial transform has been constructed: $P(x) = (x - r_n)z$ where $r_n$ is the previously established coefficient, i.e. for MOD 3, and where $z$ is the multiplicative inverse of the divisor $q$. In other words $z$ is the smallest number such that MOD $(z*q, m_i) = 1$; and $m_i$ is one of the remaining moduli for which its associated coefficient has not yet been determined.

For example, in FIG. 24, the right hand table for modulus 5 is constructed using $P(x) = (x - r_n)z$. $z$ is first derived from the equation MOD $(z*q, m_i) = 1$. Such derivation is pursued as follows:

$m_i = 5$(modulus of middle row)

$q = 3$(value of the modulus of previously solved coefficient)

Thus, for MOD $(z*3, 5) = 1$ the table is derived:

| z | remainder |
| --- | --- |
| 0 | 0 |
| 1 | 3 |
| 2 | 1 |

Hence, by the above calculation $z = 2$ to make the above equation true.

At this point the above formulation of $P(x) = (x - r_n)z$ can be employed to establish the table 24 in the middle row at column 8 of FIG. 24 by substituting all the possible values of $x$, where $r_n$ is the previously determined coefficient, i.e. 0 for modulus 3, and z (as now established) is 2: For modulus 5 using:

$$P(x) = (x - r_n)z$$

$$P(x) = (x - 0)2$$

$$P(0) = (0 - 0)2 = 0$$

$$P(1) = (1 - 0)2 = 2$$

$$P(2) = (2 - 0)2 = 4$$

$$P(3) = (3 - 0)2 = 6 = 1$$

$$P(4) = (4 - 0)2 = 8 = 3$$

Accordingly, for modulus 5, the table below is derived from the foregoing computations.

| Input | Output |
| --- | --- |
| 0 | 0 |
| 1 | 2 |
| 2 | 4 |
| 3 | 1 |
| 4 | 3 |

The table derived above constitutes the decoding table appearing in the 8th column of FIG. 24 for modulus 5.

To derive the decoding table in the 8th column of FIG. 24 for modulus 4 the same procedure is followed employing formula $P(x) = (x - r_n)z$. To first derive $z$, the formula MOD $(z*q, m_i) = 1$ is used where:

$m_i = 4$(modulus of bottom row)

$q = 3$(value of the modulus of previously solved coefficient)

It is to be noted that the only "coefficient" solved for column 8 so far has to do with the top row in FIG. 24)

Thus, substituting into the equation as now established i.e. MOD $(z*3,4) = 1$, it is noted that the equation is true where $z = 3$. This value for $z$ is then used in $P(x) = (x-r_n)z$ to derive the table in the 8th column for modulus 4:

Whereby for modulus 4:

$P(x) = (x-0)3$ $P(0) = (0-0)3 = 0$ $P(1) = (1-0)3 = 3$ $P(2) = (2-0)3 = 6 = 2$ $P(3) = (3-0)3 = 9 = 1$

Hence, for modulus 4 the following table has been provided:

| Input | Output |
|-------|--------|
| 0 | 0 |
| 1 | 3 |
| 2 | 2 |
| 3 | 1 |

Accordingly, decoding tables have been constructed for the 8th column.

In order to construct the final table in column 9 for modulus 4 it is necessary to decode the preceding coefficient associated with modulus 5 to obtain $r_n$. This is accomplished by reference to the input designated by the short arrow adjacent the table in column 8 for the middle row of FIG. 24. The arrow is disposed at the digit 3 level. According to the table a 1 appears and accordingly, 1 is the decoded output coefficient.

Accordingly, to derive the table for the 9th column of FIG. 24 for modulus 4 the same formula $P(x) = (x-r_n)z$ is used. The term $z$ is derived by:

MOD $(z*q, m_i) = 1$ where $m_i = 4$ (modulus of bottom row)

$q = 5$ (value of the modulus of previously solved coefficient)

so MOD $(z*5, 4) = 1$ whereby $z$ must have a value of 1 to cause the equation to be satisfied.

The table is constructed again using the equation:

$P(x) = (x-r_n)z$ where: $r_n$ is the next previously established coefficient, i.e. 1 (for MOD 5) and $z$ is 1.

For MOD 4:

$P(x) = (x-r_n)z$ $P(0) = (0-1)1 = -1$ $P(1) = (1-1)1 = 0$ $P(2) = (2-1)1 = 1$ $P(3) = (3-1)1 = 2$

Since the addition of a number equal to a modulus cannot change its value in residue notation, modulus 4 is added to the first value (i.e. $-1$) to make it a positive number, (i.e. 3).

Accordingly, the table in column 9 for modulus 4 is:

| Input | Output |
|-------|--------|
| 0 | 3 |
| 1 | 0 |
| 2 | 1 |
| 3 | 2 | the mixed radix coefficient, $a_1$, for modulus 4 can be readily detected by reference to FIG. 24. In FIG. 24 the above table has been entered in the 9th column of the third row. It is there noted that the input to this particular table appears at the digit 2 level and, at that level, there is designated a numeral 1 as the output from that table. The output of MOD 4 defines the coefficient $a_1$; of MOD 5 defines $a_2$; and of MOD 3 defines $a_3$.

The mixed radix form as noted above is:

$x = a_1(3*5) + a_2(3) + a_3$

Knowing the values of the coefficients to be 1, 1, 0, it is now possible (by substitution of these decoded coefficients 1, 1, 0 for $a_1, a_2, a_3$) to note that the value of $x$ is 18.

As a check on the foregoing answer it is to be observed that $19 + 14 - 28$ provides an answer of 5 and when the 5 is processed via that stage of the system represented by the polynomial transform $x^2 - 2x + 3$ it becomes converted to 18, as previously determined.

The previous examples of encoding, addition, subtraction, use of polynomial transforms, and decoding are all incorporated into FIG. 24 where 14 is added to 19 and 28 is subtracted from their sum. This difference is then substituted for $x$ in the polynomial transform $x^2 - 2x + 3$ to provide an output in residue form of the result, i.e. 0, 3, 2.

In order to decode this residue notation into a normal number, such as decimal, this residue notation is first converted to a mixed radix representation of the result by means of first deriving the coefficients for each of the moduli 3, 5, 4, as coefficients $a_3, a_2, a_1$. The weighting factor for a coefficient is the product of 1 and all the moduli of the previously detected coefficients. In this case the weighting factor for $a_3$ is 1 since it is the first derived coefficient. For $a_2$, it is $1 \times 3$ since the modulus 3 coefficient was determined previously. For $a_3$ it is $1 \times 3 \times 5$ since the coefficients associated with moduli 3 and 5 had been determined.

Means functioning to operate in accordance with the function of the tables in FIG. 24 is shown in FIG. 1 as now to be described.

The key elements in the system shown in FIG. 1 comprise "maps" which constitute means serving to associate a given input with a predetermined related output so that the position of the inputs and outputs obtain what may be referred to as a spatial relationship in establishing their respective values. Thus, where a signal appears on one line it has one predetermined value and where it appears on another line it has another predetermined value associated with the position of that particular line. Each of the maps is constructed to associate a given spatial input with a given spatial output related in accordance with a particular polynomial transform of the information. For example, with reference to map 5-1, inputs 7, 8, 9 and 10 (associated with residue digit levels of 0, 1, 2 and 3 respectively) provide outputs 12 - 14 and 11 respectively whereby outputs 11 through 14 are also associated with residue digits 0 through 3 respectively for providing the input state to the next stage.

More particularly, with regard to map 5-1 and with reference to FIG. 24 a table 5-1'' indicates that an input at the digit 0 level is directed to provide an output at the digit 1 level. Similarly an input at the digit 1 level to table 5-1'' is indicated to provide an output at the digit 2 level. An input at the digit 2 level of table 5-1'' (shown by the arrow) is directed to provide an output at the digit 3 level, and an input at the digit 3 level is directed to provide an output at the digit 0 level.

The foregoing relationships are clearly to be associated with the map 5-1 in FIG. 1 where an input along line 7 provides an output along line 12. An input along line 10 to map 5-1 provides an output along line 11. From the foregoing it is readily evident that there is a direct relationship between the tables in FIG. 24 and the construction of the maps in FIG. 1.

When beginning the problem of computing $(19 + 14 - 28)$ transformed by the polynomial $f(x) = (x^2 - 2x + 3)$ via the system as shown in FIG. 1 the inputs are initially applied to the digit 0 level at terminals 31, 32, 33. This has been done in reference to the above explanation. However, where data from prior results (in residue notation) has been stored and now needs to be added to $(19 + 14 - 28)$ and then transformed by $f(x) = (x^2 - 2x + 3)$ the stored results are applied to the appropriate input terminals.

The system shown in FIG. 1 employs particular maps for processing particular numbers. For example, map 5-1 is employed for processing the number 9 with respect to modulus 4 (the bottom row). If, instead of employing the numeral 9 it had been desired to employ the numeral 7, a different map 19 would have been selected as now to be described with reference to FIG. 2.

Accordingly, means are provided as shown in FIG. 2 for selecting any one of ten maps for incorporation into the system at the modulus 4 row. In FIG. 2 ten maps are shown in which the inputs and outputs are related in the manner dictated by the polynomial transform $P_n(x) = x + n$ where $n$ is any of the possible digits for that decimal place. For example, where $n$ is 9 the table shown in FIG. 12 has been derived using the techniques of FIG. 11. Thus, (for MOD 4) a 0 input provides an output of 1. The input of 2 provides an output of 3 etc. to provide the map 5-1 and table 15' (FIG. 24). In FIGS. 1 and 2 if map 5-1 were to be changed from a 9 to a 7 the following table would be employed, derived from the same equation of FIG. 11 but changing the 9 to a 7.

| Where x is: | remainder: |
|---|---|
| 0 | 3 |
| 1 | 0 |
| 2 | 1 |
| 3 | 2 |

Thus, for modulus 4 as shown in FIG. 2 map 5-1 (for #9) can be replaced by any one of nine other maps, such as map 19 (for #7), in which the inputs and outputs are related in a predetermined manner. An input on the 0 digit line provides an output on the 3 line. An input at the digit 1 level provides an output at the digit 0 level. Accordingly, by "selecting" (activating) any one of the ten maps shown in FIG. 2 (to the exclusion of the others) a numeral can be introduced into the system of FIG. 1 for purposes of solving a problem.

Thus, means for selecting one of the ten maps shown in FIG. 2 is represented by the (selector means) box 21.

As shown, small circles 22 represent modulators, (including switches or other means) for coupling or routing a signal arriving on one of lines 26 to be applied to the input lines 20 of a selected map.

Since FIG. 2 pertains to modulus 4 only 4 input and output lines are shown leading to and from the maps of FIG. 2. A signal applied to one of the four input lines 26 designated as one of the residues 0, 1, 2, 3 can only be transferred to one of the output lines 27 through that one of the ten maps which is selected. By means of suitable selection means 21, such as by applying an appropriate control signal to one of the activator leads 28, a signal passing through that particular map will be distinguished relative to signals passing to the other maps. For example, if the map for the number 6 is switched "on" in this manner it will be substituted for the map 5-1 associated with the numeral 9 for purposes of adding the numeral 6 to the equation in place of 9.

In FIG. 1 the top row of maps represents modulus 3, while the middle and bottom rows represent moduli 5 and 4 respectively.

In operation, to solve the calculation $(19 + 14 - 28)$ when processed via $x^2 - 2x + 3$, signals are applied to points 31, 32, and 33 which correspond to the 0 digit of each of the moduli (where it is assumed that this is the initial calculation and that no previous data has been stored for entry at any other digit levels).

The first column of maps on the left represents the encoding of one unit of 10 for moduli 3, 5, 4 respectively. The polynomial for the top row (modulus 3) is $P(x) = \text{MOD}(x + 1*10, 3)$ as noted in FIGS. 9, 10. Thus, inputs 0, 1 and 2 must become associated with outputs of 1, 2, and 0 in the top row. The signals representing moduli 5 and 4 must pass through similar maps, each generated from its appropriate modulus in the foregoing formulation (FIGS. 9, 10). The signals are subsequently routed via maps for moduli 3, 5, 4 derived for numeral 9 in the units place of number 19. The signals will then emerge at digit levels 1, 4, 3 which represent numeral 19 in residue notation as noted above. Numeral 14 is subsequently encoded in a similar manner. The signals emerge from the 4th column as 0, 3, 1, which is the residue result of $19 + 14$ with respect to moduli 3, 5, 4. The signals are then routed through maps corresponding to numeral $-28$ as explained above. The signals emerge from the 6th column at residue digit levels 2, 0, 1.

Maps 21 through 23 have been constructed to accomplish the polynomial transform $x^2 - 2x + 3$ as above described in accordance with the tables of FIG. 7 derived in FIG. 6. For modulus 3 (top row) the table associates inputs of 0, 1, 2 with outputs of 0, 2, 0. The signals for each of the moduli 3, 5, 4 entering at 2, 0, 1 thus emerge from column 7 (FIG. 1) at 0, 3, 2 respectively as in the example shown in FIG. 7 when using these same inputs of 2, 0, 1 from column 6.

When decoding in column 8, the coefficient $a_3$ is taken as the detected result for modulus 3, which in the present instance is 0. Maps 74, 76 are selected pursuant to the polynomial $P(x) = (x - r_n)*z$ for decoding residue. In the case of modulus 5, inputs 0, 1, 2, 3, 4 generate outputs of 0, 2, 4, 1, 3 respectively in map 74. In the case of modulus 4 inputs 0, 1, 2, 3 generate outputs of 0, 3, 2, 1 respectively in map 76. Map 74 for modulus 5 was derived as follows:

where:

$r_n = 0$ (coefficient of previously solved modulus)
$z = 2$ (for MOD 5 as derived above)
$P(x) = (x - r_n)z$ $P(0) = (0 - 0)2 = 0$ $P(1) = (1 - 0)2 = 2$ $P(2) = (2 - 0)2 = 4$ $P(3) = (3 - 0)2 = 6 = 1$ $P(4) = (4 - 0)2 = 8 = 3$ and for map 26, where $r_n = 0$ and $x = 3$ and modulus is 4:

$P(0) = (0 - 0)3 = 0$ $P(1) = (1 - 0)3 = 3$ $P(2) = (2 - 0)3 = 6 = 2$ $P(3) = (3 - 0)3 = 9 = 1$

The selection of map 74 serves to permit the solving of coefficient $a_2$ based on the input at the digit 3 level from map 22. Thus, the input 3 to map 74 generates an output of 1. Coefficient $a_2$ is thus detected as 1 for modulus 5. Using this newly generated information a map 25 is next selected for converting the output of map 76 to the value of coefficient $a_1$, using the equation:

$P(x) = (x - r_n)z$ where $r_n = 1$ (coefficient of previously solved modulus) and $z = 1$ (as derived above).

Thus,
$P(0) = (0 - 1)1 = -1 + 4 = 3$ $P(1) = (1 - 1)*1 = 0$ $P(2) = (2 - 1)*1 = 1$ $P(3) = (3 - 1)*1 = 2$ Thus, map 25 couples inputs of 0, 1, 2, 3 to related outputs 3, 0, 1, 2 respectively so that the output of map 76 at the digit 2 level, when fed to map 25, provides an output of 1. Coefficient $a_1$ is therefor derived as 1.

To convert the mixed radix notation to decimal, the values of the above coefficients $a_1$, $a_2$, $a_3$ are substituted in the expression: $a_1(3*5) + a_2(3) + a_3$ so that where $a_1 = 1$; $a_2 = 1$; and $a_3 = 0$ the result is $15 + 3 + 0 = 18$ in decimal which is the answer to the calculation. Since the sign is represented implicitly and $a_1$ is not 2 or 3 then the number is positive.

In a system as above described the presence of negative numbers can be detected by the following criteria: (a) the modulus of the most significant mixed radix coefficient (i.e. modulus 4 for "$a_1$" in the above example) is even; and (b) such coefficient lies in the upper half of its related modular range, (i.e. residue digits 2, 3 for modulus 4).

To derive the decimal value of such a negative number, M (the product of all the moduli that are employed, (i.e. 3, 5, 4) must be subtracted from the result of the decimal conversion.

As shown in FIG. 1 one of three detectors 46, 47, 48 ultimately receives the output signal representing the residue digit associated with modulus 3. Similar detectors are provided for receiving the output signal representing the residue digit associated with modulus 5, and with modulus 4. In the present instance the signal appears at detector 46 with regard to modulus 3.

Map 74 as derived above (for modulus 5) is modulated, activated or otherwise responsive to be pre-conditioned by the output from map 21 by means of the connection 49 coupled to pre-condition or modulate the inputs to maps 74 and 76 so as to affect an input signal appearing on one of the inputs thereof. Thus, the signal appearing on line 49 conditions modulators 50 whereby as an input appears on one of the associated input leads it will appear at the output side of the map at a related position.

Had the output from the modulus 3 row appeared at detectors 47 or 48, then the associated one of the connections 51, 52 would serve to modulate, activate or otherwise pre-condition inputs to a map (not shown) constructed in accordance with the above equations and rules.

Similarly, an output lead 53 carries the "1" output from map 74 to modulate, activate or otherwise pre-condition the inputs to map 25 also constructed pursuant to the above equations and rules. Other maps (not shown) can be constructed following the same rules and equations for receiving the other inputs of 0, 2, 3, 4 from the final stage of the modulus 5 row. Such maps are similarly activated, modulated or otherwise pre-conditioned via leads 43, 44.

Means for monitoring the outputs of all detectors for each row for purposes of generating an error signal associated with each row serves to cause the system to be reconfigured to eliminate such error and to continue processing using the remaining moduli. Thus, monitors 57, 58, 59 of suitable type which can determine erroneous output states, such as: when more than one output signal is being generated for the associated modulus; when no signal is generated for the modulus; when the output signal fails to fall within a predetermined range, etc. are provided.

As a result, the processing system shown in FIGS. 1 and 25 is substantially inherently self-correcting. For example, if it is assumed that the output port 16 of map 3 should fail, an abnormal signal will be generated at the output of the modulus 3 row which will be detected by monitor 57. Each of the detectors 46-48 is directly connected to an associated monitor 57 (in the case of modulus 3) and in response to detecting the erroneous signal, an error signal will appear on the output lead 61 for purposes of modulating, activating or otherwise pre-conditioning the inputs to new sets of maps as now to be described for compensating for the error in the modulus 3 row.

Briefly, as shown in FIG. 25, the error signal on connection 61 serves to pre-condition maps 34, 29 whereby the output from the preceding stage is fed, in the case of modulus 5 directly to a detector 62. An output lead 63 from detector 62 serves to pre-condition, activate or modulate the input leads to a selected map 36 whereby the MOD 4 signal can be transmitted to its detectors. As thus arranged the coefficient values for $a_1$ and $a_2$ now become three in each instance, whereas previously the coefficients had been detected as 1, 1, 0 for all three modulus rows.

It is to be noted that the foregoing self-correcting feature has eliminated one modulus. Therefore, the range M of the system within which correct answers can be achieved is reduced by a factor corresponding to the modulus of the portion of the system which is lost. Where only three moduli are used, as disclosed herein, the reduction in range can be significant. However, in a typical application it is contemplated that a great number of moduli will be employed.

Further, it is to be appreciated that monitor 57 will not "cut out" the modulus 3 output for computations which do not employ port 16, assuming that there is no other fault in the modulus 3 row.

In the above situations the signals from maps 72, 73 which are yet to be detected are then routed through an associated map 34, 29 (FIG. 25) constructed on the basis of $P(x) = x$ or otherwise bypassing the normal incorporation of the results of the faulty modulus signal into the decoding process for the remaining coefficients since the output of map 71 is not useable. In FIG. 25 map 34 based on $P(x) = x$ has been substituted for map 74 of FIG. 1 so that the coefficient $a_2$ is changed from 1 to 3.

To derive the coefficient for modulus 4, i.e. $a_1$, the foregoing expressions are again employed:

$$P(x) = (x - r_n)z \text{ MOD } (z^*m_r, m_i) = 1$$

In the present instance where only coefficients $a_1$ and $a_2$ are to be employed and the coefficient for $a_2$ has already been established as a 3 a map 36 is now selected for modulus 4 in the form of $P(x) = (x - 3)^*1$ where $z = 1$ as above derived from the expression MOD $(z^*5,4)$. Accordingly, map 36 as shown in FIG. 25 is constructed to receive the outputs from map 73 directly via the "by-pass" map 29 from which the outputs from map 73 are passed unchanged. Map 36 is constructed in accordance with the polynomial $P(x) = (x - 3)^*1$ to provide the following table of inputs and outputs.

| Input | Output |
|-------|--------|
| 0 | 1 |
| 1 | 2 |
| 2 | 3 |
| 3 | 0 |

Accordingly, applying the output directly from map 73 to an input of map 36 at the digit 2 level via bypass map 29 supplies the coefficient value $a_1 = 3$.

As noted above the weighting factors for each of the coefficients $a_1$, $a_2$, $a_3$ correspond to the product of the moduli associated with each of the previously derived coefficient(s). Thus, for coefficient $a_1$ the product of the moduli 5 and 3 normally provides the weighting factor. In the case of coefficient $a_2$ the weighting factor corresponds to 3 which is equal to the previously derived modulus. In the case of coefficient $a_3$ the weighting factor of the coefficient is in units.

Accordingly, inasmuch as it has been assumed that the top row or modulus 3 row of the system shown in FIG. 1 has been disabled the weighting factors for coefficients $a_1$ and $a_2$ will also change. The weighting factor for $a_1$, accordingly, becomes 5 (representing the modulus of the previously derived computational segment or row) and for coefficient $a_2$ the weighting factor will be unity.

However, the value of $a_2$ has now changed from 1 to 3 (FIG. 25).

To derive the answer from the foregoing the formula, assuming the results will be positive, thus becomes $x = (a_1)5 + a_2$, where $a_1 = 3$; $a_2 = 3$. In this case it becomes $15 + 3 = 18$ which is the same result as before.

Since only moduli 5 and 4 have been used in the computation, the range M is reduced to $5^*4 = 20$. The probability of a calculation requiring a signal to be routed through a faulty port such as 16, for modulus 3 is, from inspection, 1 out of $3^*10$. In all other cases the signal would be normal and the system unaffected. Thus the probability of a fault affecting a given calculation is quite low. Abnormalities can occur in the signals of a number of modular segments and the system can automatically remove the affected segment or segments from the decoding process and reconfigure itself to preserve the correctness at the greatest permissable range for a particular calculation. This gradual degradation also greatly improves the overall reliability of such a system since it merely compensates for various faults rather than failing completely.

To perform generalized multiplication the multiplier must first be converted to residue notation. This can be accomplished by the previously discussed encoding procedure. The result is then detected and signals of the multiplicand are routed through maps corresponding to the residue multiplication by the residue equivalent of the multiplier.

As shown generally in FIG. 26 and more specifically in FIGS. 27 through 32 means are provided to be incorporated into the system of FIG. 1 for purposes of multiplying a first residue number by a second residue number and for transmitting the results of such multiplication onwardly through the remainder of the system. In addition, means for encoding a suitable multiplier have also been provided to supply one of the two residue numbers which are being multiplied together.

With reference to FIG. 26 a multiplication subsystem of the kind described is diagrammatically represented as incorporating a plurality of multiplication units 35, 38, 56 respectively to be incorporated into the mod 3, mod 5, and mod 4 rows of the FIG. 1 system at a position, for example, immediately ahead of maps 71, 72, and 73. Disposing the multiplication units 35, 38, 56 at this location has been selected for convenience in explanation.

Each multiplication unit includes a residue multiplication section (FIGS. 30, 31 and 32) and means for deriving a multiplier in residue form from decimal notation as disclosed for each multiplier in FIGS. 27, 28 and 29.

For example, FIG. 32 shows that portion of a multiplication unit 56 for mod 4 which includes four residue multiplication maps capable of multiplying a residue number arriving from map 65 of the mod 4 row via the input lines 77. Each of the four maps 85, 90, 75, 69, is controlled by an activator line 78, 79, 81, 68 respectively. Signals on any one of lines 68, 78, 79, 81 serve to activate or pre-condition the modulators (associated with each of the maps) as represented by the small circles 82. Accordingly, as a signal appears on one of the input lines such as 77 of modulus 4 row of FIG. 1 (representing a given residue notation) that particular residue signal will be handled by that one of the four maps in FIG. 32 which has been previously activated or pre-conditioned by means of a signal on one of the four activator control lines 78, 79, 81, and 68 respectively.

For example, if it is assumed that an activating signal appears on line 68 for pre-conditioning the modulators of map 69 an input, for example on the residue 3 line of 77 will enter map 69 at the residue 3 level and depart map 69 at the residue 1 level, coupled to that one of the output lines 88 for residue 1.

The foregoing multiplication entails the multiplication of one residue by another directly. For example, it is to be noted that the input was residue 3 and the multiplier appeared on the $r_3$ line 68. It is then to be observed that 3*3 = 9 and MOD (9,4) provides a remainder or residue of 1. This residue 1 corresponds to the answer provided by map 69.

The maps of FIGS. 30, 31, and 32 can each be readily constructed knowing that the input line, such as one of lines 77 will be multiplied by a residue level of an associated one of the several activator lines.

For example, with regard to FIG. 32, to multiply residue 2*2, a residue 2 input along its associated input line 77 is multiplied by map 75 controlled by the $r_2$ activator lead 81. Since 2*2 = 4 and MOD (4,4) provides a remainder of 0 the input on the residue 2 level via line 80 provides a residue output on the 0 level.

With respect to FIG. 2 it is to be noted that any one of ten decimal numbers can be encoded into residue notation for modulus 4. Thus, in the case of modulus 4 all residue outputs from encoding a decimal number are stated in terms of one of four outputs, i.e. $r_0$, $r_1$, $r_2$ and $r_3$.

Means comparable to FIG. 2 for encoding a decimal number into residue notation for supplying the encoded residue notation to one of the four activator lines 78, 79, 81, and 68 has been shown in FIG. 29 employing ten maps for the ten decimal numerals 0 through 9. The similarity between FIG. 29 and FIG. 2 is such that additional explanation is not believed required other than to state that in encoding any given number from 0 through 9 the selector means 21 or any other suitable source should provide a signal to the residue 0 inputs of all maps of FIG. 29 as represented by the lead 83. In the absence of any other signal source, selector means 21 provides, in known manner, an output signal on a lead 83 in response to activating one of the leads 28, whereby the residue 0 level of each of the ten maps receives an input. If the selected multiplier is a decimal 7 the activator lead 28 associated with decimal 7 is operated and the signal on the residue 0 level will pass through map 19 to a residue 3 output line 84.

The signal on output line 84 is coupled to that one of lines 27 representing a residue 3 level and designated by the reference numeral 68. Hence, a signal $r_3$ on activator line 68 serves to control map 69 for multiplying the residue notation present on input lines 77 (from the modulus 4 row of FIG. 1) by residue 3.

For example, if the signal from the modulus 4 row appears at the residue 1 level for input lines 77 it will enter map 69 via lead 86, pass through map 69 and exit map 69 via lead 87. It is evident from inspection that the output lead 87 lies at the residue 3 level which also is the product of mutiplying residue 1 by residue 3.

Subsequently the output from lead 87 is transferred back to the modulus 4 row at a residue 3 level via lead 88.

As thus arranged it is readily evident that means have been provided for encoding a given decimal number into residue form and using the residue notation as a multiplier serving to multiply a second decimal number in residue notation appearing on one of the input lines 77, 67 (FIG. 31), or 41 (FIG. 30).

As noted above in order to encode a decimal number into residue notation a signal is applied via the residue 0 input line. Means noted above for applying such signal is represented by the line 83 in FIG. 29. It should be readily evident, however, that the 0 pulse for the encoding maps of each multiplier encoding section does not have to come from the selector means but can come from any suitable source.

The foregoing arrangements as described in FIGS. 27, 28, and 29 serve to encode into residue notation numbers between 0 and 9. In the event that it is desired to multiply in the system shown in FIG. 1 higher order numbers techniques described above can readily be expanded as shown diagrammatically in FIG. 33. The encoding unit 91 comprises the same means for encoding units into residue notation as before. A second bank of encoding each order of ten between 0 and 90 has been coupled thereto. The residue output lines 92 are coupled directly to transmit the residue signal on the proper related input line 93 of the units encoding portion of the encoding unit 91. A multiplication section 94 corresponds to the multiplication section shown in FIG. 30.

FIGS. 34 and 35 diagrammatically represent the encoding and multiplying sections of multiplying units for the modulus 5 and 4 rows of FIG. 1 constructed using the example of FIG. 33.

It is often desired to be able to add, subtract or multiply residue numbers directly. To perform such a residue calculation the signals must be routed through maps equivalent to $P(x) = \text{MOD}(x \oplus r, m_i)$ where $r$ is the residue digit involved, $\oplus$ indicates the operation of either addition, subtraction, or multiplication, and $m_i$ is the modulus represented by each signal.

It is possible to preprocess a number while encoding. To multiply a number by a constant, signals of each modulus would be routed through maps with an effect equivalent to $P(x) = \text{MOD}(x + \text{MOD}(d*w*c, m_i), m_i)$ where $d$ is the contents of a particular digit of the number, $w$ is the weighting factor of the digit, $m_i$ is the modulus, $c$ is the constant desired. To subtract a preprocessed number the signals must be routed through a map with an effect equivalent to $P(x) = x + (m_i - \text{MOD}(d*w*c, m_i), m_i)$.

Means for multiplexing a plurality of different kinds of signals through a system of the type shown in FIG. 1 can, for example, be achieved by means as shown in FIGS. 39 to 41.

With reference to FIG. 39 a modulator 98 such as a transistor or the like has been arranged whereby an input signal on lead 99 will be affected, changed or prevented from transferring to an output lead 102 in response to the signal on a modulator lead 101. In multiplexing a plurality of different signals through a map common to all of the signals means such as shown in FIG. 40 have been employed to replace the conventional modulator 98 and its input, output, and modulating lead 101. For example, as shown in FIG. 40 modulators 98', 98'', and 98''' are disposed in parallel to receive only those signals permitted to pass via an associated filter 103, 104 or 106 respectively. Thus, when various types of signals arrive at the input lead 107 signals of these different types are independently permitted to constitute inputs to the map coupled to the three modulators.

With reference to FIG. 41 there is shown a single map 5-1' comparable to map 5-1 shown in FIG. 1 with its associated inputs and outputs 7-10 and 11-14 respectively. Map 5-1 as shown in FIG. 41 is, however, referred to as map 5-1' for purposes of clarity since it is associated with different input structure. For the same reason, input leads 26' correspond to the input leads 26 as shown in FIG. 2. A plurality of multiplexing units 108, 109, 111 are interposed between the input leads 26' and map 5-1'. Each multiplexing unit, such as unit 111 includes filters 112, 113, 114, and 116 coupled in series with an associated one of its modulators 117.

Parallel output leads 118 serve to couple the outputs of each of the multiplexing units 108, 109, 111 for supplying the output signals therefrom to map 5-1'.

In addition to the above, a plurality of selector means of a type that is shown in FIG. 2 are individually associated respectively with units 108, 109, 111 whereby signals of each of three types designated $f_1$, $f_2$, $f_3$ for different frequencies can be handled simultaneously through map 5-1'.

Accordingly, the selector means 119 has been provided in association with the signal $f_3$ and, as shown, it is conditioned to make a selection for the numeral 9. It is to be understood that map 5-1' is, as shown in FIG. 2, appropriate for converting numeral 9 into residue notation and constitutes one of ten maps of a type as shown in FIG. 2. Thus, when numeral 9 has been selected by 119 signals characterized by signal $f_3$ will be modulated by unit 111 to pass outwardly onto lines 118 and via map 5-1' to the rest of the system.

As shown in FIG. 41 a selector means 121 for a different signal $f_1$ and a second selector means 122 for another signal $f_2$ have been provided and each serves to operate associated activator leads 123, 124 for ten modulating units such as 108, 109 associated with their respective signal types. As shown, selectors 121 and 122 are conditioned to encode a numeral 9 for signals $f_1$ and $f_2$ and accordingly, the same map 5-1' will be used, but under control of modulator units 108, 109.

Thus, with respect to selector 121 and modulating unit 108 the control line 123 serves to activate unit 108 so that signals $f_1$ arriving via input lines 26' may pass or be modulated by unit 108.

Similarly, activator control line 124 of selector 122 serves to activate modulating unit 109 for passing signals of type $f_2$.

From the foregoing it will be readily evident that each of the maps, such as those shown in association with modulus 4 in FIG. 2 can readily accommodate the transmission therethrough of a plurality of signals simultaneously of different frequencies or other signals having other distinguishing characteristics simply by introducing multiplexing units of the kind shown in FIG. 41 and connecting each unit to an associated selector means for operating same.

In multiplexing signals each set of modulators with the aid of suitable filters must either affect a different type of signal or a signal in a particular way. An example of multiplexing by differientiating different types of signals has been demonstrated above with regard to differientiating on the basis of frequency.

Means for "pipelining" information through the system of FIG. 1 serves to greatly enhance the efficiency of the system as now to be described. Heretofore data handling systems which wait for the completion of the processing of a first calculation before commencing the next have been difficult to operate at a high rate of through-put due to the lag. Yet, if a second calculation begins before the completion of the first the data from the two calculations can become mixed. Means are provided, however, for solving this problem as now to be described.

As shown in FIGS. 36–38 each computation is commenced in response to a predetermined clock 129 or starting signal in a manner referred to hereinafter as "pipelining."

To pipeline the system as shown in FIG. 1 signal delays between modulators need only be sufficient to allow for modulator settling time. In the case of decoding, the propagation of remaining undetected signals must be delayed sufficiently to allow for detection of the particular signal and activation of the desired modulators along with their associated settling times.

As noted above with respect to FIGS. 1 and 2 it is to be appreciated that each of the activator leads 28, 28', 28'' and 28''' are derived from a suitable known selector means 21, 21', 21'' etc. of the type in which the input of a number generates an activating control signal on a related one of ten output leads of the selector.

Means for supplying computations to be pipelined through the system of FIG. 1 is shown with regard to FIG. 36 as including a first data register 128 of known type serving to contain a plurality of data inputs as represented in each of the squares 128a through 128f and including the representation of a polynomial transform ($x^2 - 2x + 3$) as shown in the square labeled 128g. Information is dispatched from each of the portions of register 128 under control of a high speed clock means 129. As the information is discharged from register 128 it passes into a delay unit 131 through which the information from the first portion 128a of register 128 is transmitted directly via line 132 into selector 21'. Information transferred from portion 128b of register 128 is transmitted via lead 133 to selector 21 via a time delay means 134 which, for example, can simply be an extra length of the conductive lead 133 so that the information on lead 133 arrives at selector 21 at time one represented by $T_1$. Similarly, with regard to portion 128c of register 128 the information therein is transmitted along lead 136 via time delay means 137 providing twice the delay of means 134. The information from portion 128d is delayed an additional unit of time by time delay means 138 so that it is delayed by 3 units of time and it is to be noted that successively the time delay for each register portion is one additional time delay unit.

Accordingly, it is evident that while all of the information is discharged simultaneously from register 128 into unit 131 it arrives at selectors associated with the various portions of register 128 at increasingly later times.

A second register 139 contains information in a plurality of portions thereof for purposes of introducing the components of a second calculation to be made which, as shown in FIG. 36 will be (20 + 8 + 30 + 2 − 50 − 7) * ($x^2 - 2x + 3$). The information for register 139 is received from a suitable known data source 141 whereby in response to each count of clock 129 the components of each new calculation will be advanced from register 139 to register 128 and from register 128 into delay unit 131 under suitable known controls, such as master/slave flip-flops. Delay unit 131 can also be fed directly from suitable data sources rather than employ registers 128, 139. Graphical representation of the pipelining arrangement previously described in FIG. 36 is illustrated in FIG. 37 in which letters have been used to represent the information in each of the portions of register 128.

Accordingly, initially it is shown at the bottom of FIG. 37 that a calculation comprising five A's are to be advanced into the system for processing. The delay means above described is shown diagrammatically in FIG. 37 immediately the above the input computations. As a covention the left hand column of letters have been given a subscript numberal 1, the second column from the left has been given a subscript numeral 2, and so forth in order to identify each computation portion.

Immediately upon transferring the A line into the delay means 131, $A_1$ moves directly to the selector means associated with its column at time $T_0$. $A_2$, is delayed by one count and accordingly appears at line 2, i.e. time $T_1$. $A_3$ being further delayed has only reached line 3 when $A_1$ has reached its selector means. Similarly $A_4$ and $A_5$ are delayed one count with respect to their preceeding data.

As thus arranged, by the time the residue results of the $A_1$ input reach the map selected by the number two selector the $A_2$ data will have reached the number two selector. Similarly, by the time the data processed from the maps selected by the first two selectors reaches the third map (for a given modulus) the $A_3$ data will have reached the number 3 selector means to have effected a selection of the third map whereby the previously processed residue information can pass through the appropriate map related to $A_3$.

Similarly, for $A_4$ and $A_5$ and their relationship with their selector means.

While the foregoing represents the action between the oncoming data $A_1$ through $A_5$ and their respective selector means and the manner in which they serve to insure that the correct map has been selected for the data as it is entering the system at different stations therealong, it is to be noted that the first information, namely $B_1$ of a second calculation has already commenced to change the condition of the first selector one count after the $A_1$ information has passed through it even though the computation for $A_1 - A_5$ has not yet been completed. Thus, information for a number of calculations can be traveling simultaneously through the system at different stages of processing. Accordingly, the information for the calculations will be arriving in successive waves at the decoding means at the right hand end of FIG. 1.

As noted above, the decoding of a number in residue notation has been accomplished in something of a staggered fashion starting with the results from map 71 (FIG. 1) and then obtaining the results of map 74 followed by obtaining the results of map 25.

Thus, means are provided for assuring that the mixed radix co-efficients for each given calculation occur in a pipelined manner to provide the answer to each calculation. In this regard, a calculation is considered to be the combination of data simultaneously released from register 128.

As described above, the selection of a given map for deriving the mixed radix co-efficients $a_2$ and $a_1$ is dependent upon the value of the modulus for which a co-efficient has been previously detected. For example, in FIG. 38 line 49 serves to activate modulators 50 for conditioning maps 74, 76. In order to provide time to effect selection of maps 74, 76 additional delay means 146, 147 have been provided in advance of maps 74, 76. For similar reasons the delay means 148 is provided in advance of map 25. The diagram in FIG. 42 best explains the condition of the system at any given time.

The result of a computation D in residue notation, R, is indicated in the left hand column of FIG. 42 as R(D) for each of the three rows for mod 3, mod 5, and mod 4. At the same time the preceeding computation C has been converted in the mod 3 row to a mixed radix form MR(C) and approaching delay 142. At the same time computation C still remains in residue notation R(C) for mods 5 and 4. Further, at this same point in time computation B has been converted to mixed radix for both the modulus 3 and 5 rows but still remains in residue notation for the modulus 4 row as shown approaching delay 148. Similarly, the computation A has been fully converted to mixed radix MR(A) as shown in the right hand column of FIG. 42.

Pipelining increases the through-put of the mixed radix conversion section. The coefficients, however, emerge in a skewed manner in time.

Accordingly, as shown in FIG. 38 means are provided for causing all of the mixed radix co-efficients to be read out at the same time, if desired.

Thus, with respect to the modulus 3 row, delay means serving to delay the output signal by two counts of clock 129 comprises the two portions as shown in boxes 142, 143. The output of the modulus 5 row includes a delay means 144 for holding up the output by one count of counter 129.

Thus, in the case of decoding, the propagation of the remaining undetected signals must be delayed sufficiently to allow for the detection of the particular signal and activation of the desired modulators along with their associated settling time.

The time delay means of FIG. 38 can also be provided by suitable means which can simply be an additional length of conductive wire so that information traveling through the unit is delayed to arrive at a different time.

Having decoded the mixed radix coefficients $a_1$, $a_2$ and $a_3$ known means, as represented in FIG. 38 convert these coefficients to decimal numbers or other appropriate computer information for handling as shown in FIG. 38. For example, the output from the detection of coefficient $a_3$ appears on lead 161, for $a_2$ on lead 162, and for coefficient $a_1$ on lead 163. Leads 161 through 163 are directed to means for converting the mixed radix notation to a more usable numbering system such as binary or decimal. Thus, leads 161 through 163 connect to a mixed radix to decimal converter 164 of known construction whose output can for example, be directed to a conventional buffer 166 or other suitable computer means.

The system lends itself readily to both electrical and optical controls. Thus, modulators 98 as shown in FIG. 39 for an electrical signal can take any one of a number of forms such as a transistor, for example. For an electrical signal embodiment the maps can be considered to have been implemented with wires connecting various inputs and outputs along the lines as shown in the diagrams explained above with the modulators being transistors, diodes, etc..

According to another embodiment optically transmitted signals are employed with maps implemented by mirrors, prisms, or the like serving to associate a signal at a given input with a given output.

Thus, a map 155 is shown in FIG. 43 in which the inputs are associated with outputs in the manner of map 5 shown in FIG. 1. However, optical means as shown in FIG. 43 are employed for transmitting optical signals between inputs and outputs.

Accordingly, a mirror 152 is positioned in a manner to receive the incoming projected light path 153 and re-direct it to mirror 154 for re-transmission outwardly of map 155 along the outward line 9'. Other mirrors have been arranged in the map 155 to accomplish the input/output relationship shown in map 5 of FIG. 1.

Modulators for pre-conditioning the light path passing into map 155 are known. Such modulators are here employed to distinguish a portion of the signal passing through a particular set of maps relative to the others.

Some examples of the foregoing are the Pocket effect used to modulate amplitude, the Kerr effect to alter the phase of a signal, or the Faraday effect to rotate the angle of polarization of a signal. Modulators of these types have already been developed for applications in optical communication and the application of these known optical effects to switching and modulating is well known, as disclosed in an article entitled "Optical Waveguide Modulators" IEEE transactions on microwave theory and techniques, Vol. MTT-23, No. 1, January 1975 pp. 57–70.

Accordingly, as shown in FIG. 43, modulators of the foregoing type are represented by reference numeral 156 for modulating the input on one of the residue levels and onto the surface of a related one of the four mirrors 152.

In the optical embodiment noted above, detectors 46, 47, 48 and detectors for the remaining moduli constitute photocells, photo diodes or other photoresponsive devices and the light sources are provided by suitable means such as by lasers or otherwise to provide (along with mirrors 152, 154 or prisms or other light deflecting means) the related light paths passing into and out of map 155 (FIG. 43).

The results of a particular computation can be used for subsequent processing. The residue result can be detected before the decoding section or by bypassing the decoding section by activating maps corresponding to $P(x) = x$. Such a residue result may be re-entered into the system by applying signals to the corresponding inputs of the first maps through which the signals are to be routed. Another approach is to route the signals through maps corresponding to addition by the corresponding residue digits. Mixed radix numbers may be re-entered via encoding maps constructed with the associated weighting factors being used as $w$.

The examples presented are also meant to cover the symmetric residue number system which is isomorphic to the residue number system. The maps generated would be the same except that the nomenclature associated with the inputs and outputs would range from $-(m/2)i$ to $(m/2)i$ instead of 0 to $m_i - 1$. In the case of modulus 5, 0 to 5 in decimal would be 0, 1, 2, −2, −1, and 0 in the symmetric residue system instead of 0, 1, 2, 3, 4, and 0 as in the regular residue system.

The effect of a single map can also be derived by cascading the effect of two or more other maps together. This can reduce the number of different types of maps needed at the expense of additional selection circuitry.

In summary as to the example in FIG. 1, computational information via the mechanism of maps is imbedded on the $y$ spatial dimension of a signal. Various displacements in the $y$ dimension are associated with the various residue digits. A signal entering a map at a certain $y$ displacement leaves at an associated $y$ displacement. This information could have instead been impressed on the $x$ or $z$ spatial dimension of a signal. In general, the information can be carried by any dimension or combination of dimensions of a signal be it spatial, frequency, amplitude, phase, polarization, energy, combination of, etc. A map simply comprises various associations between the input and output states of a signal.

Modulators as discussed above can be any device in which one signal can affect another.

The signals may be routed in several ways. One approach is to have the modulators serve in a switch-like mode to close some paths while leaving others open. Another approach uses the modulators to alter the signal going through a particular series of maps. The signal which traveled this path could then be distinguished. An extension of this approach serves to mark the signals passing through each map in a different manner. To find the portion of the signal which has passed through a particular set of maps it is necessary only to look for a signal with the associated markings. In this approach no selection of the maps is needed, the results of all possible calculations are available only the proper signal need to selected for detection. This simplifies the construction of the modulators since they need not be active or controllable. The results of several calculations can be sought simultaneously. All these approaches to routing can, in general, be described as routing a signal by distinguishing or differentiating in some manner the signal passing through a particular set of maps relative to the other maps.

In multiplexing, each set of modulators must either distinguish a different type of signal or a signal in a particular way. An example of multiplexing by distinguishing or differentiating different types of signals, is to use modulators to handle signals at different portions of the spectrum. An example of multiplexing by differentiating a signal in different ways is to use one set of modulators to differentiate the phase of a signal while another set differentiates the frequency. The maps must not affect the different signals in a manner such that the signals might become indistinguishable. To retrieve the multiplexed results each set of detectors must be made sensitive only to the effects of a particular set of modulators.

For an electrical signal the maps may be implemented with wires interconnecting various inputs with outputs. The modulators can be transistors. By driving various transistors into saturation or cutoff a switch type of routing can be accomplished. Another approach uses modulators to mark the properly routed signal and to sensitize the detectors via filters to a signal with these particular markings. Another approach uses the modulators to distinguish the portion of the signal passing through each particular map and then to sensitize the detectors to a particular type of signal indicative of the portion of the signal which passed through the maps corresponding to a particular calculation. Different detectors search for the result of other calculations simultaneously.

To pipeline the systems needing active modulators, signal delays between modulators should be sufficient to allow for modulator settling time. In the case of decoding the propagation of the remaining undetected signals must be delayed sufficiently to allow for detection of the particular signal and activation of the desired modulator along with their associated settling time.

To multiplex active modulator type systems, filters can be added in series to each modulator limiting their effect to a particular type of signal. Another set of modulators with different filters can be added so that a new modulator and filter is in parallel with each old modulator and filter. The new set of modulators routes a different signal in a manner dictated by another calculation. Filters can be added to make detectors sensitive to a particular signal.

To perform error detection and correction, an error condition can be triggered on the absence or degradation of a signal at the detectors and thus correctly route the remaining undetected signals.

For an optical signal the maps can be implemented with mirrors, prisms, holograms or similar optical elements to associate a signal at a given input with a given output. Modulators are constructed employing many physical effects.

Such modulators can be of a type employing any one of several physical effects. These modulators are used to differentiate the portion of a signal passing through a particular set of maps relative to the others.

Some examples include use of the Pocket effect to modulate the amplitude, the Kerr effect to alter the phase; or the Faraday effect to rotate the angle of polarization of a signal. Modulators of these types have already been developed for application in optical communication and the application of these effects to switching and modulating is well-known.

To multiplex such a system filters are added in series to each modulator limiting their effect to a particular portion of a dimension of the signal. Another set of modulators with different filters can be added so that each new modulator and filter is in parallel with each old modulator and filter. Each new set of modulators is responsive to another calculation. Filters are added to make detectors sensitive to only a particular signal. Thus, filters can limit modulators and detectors to predetermined portions of the optical spectrum and thereby provide by frequency multiplexing.

To perform error detection and error correction an error can be triggered by the absence or degradation of a signal at the detectors.

An optical signal is unique from an electrical signal in that optical signals can pass through each other without interference. Hence, optical signals are not confined by planar constraints. This aspect greatly simplifies interconnection problems which pose a significant problem for future conventional computers. A map which associates 1000 inputs with 1000 outputs is easier to implement with mirrors than with wires.

An optical signal also has the advantage that the wavefront generated by the action of the modulators and maps can be easily recorded. This is of particular importance where routing is accomplished by distinctively marking the portion of the signal passing through each map. Such a wavefront contains the results of all the possible calculations, as shown, for example, in FIG. 42. Recording this wavefront would essentially produce a read only memory containing the results catalogued by aspects of the desired calculation. An example of such a system includes a coherent signal, maps implemented with mirrors, and gratings of various periodicities and orientations to modulate the spatial frequency of the portion of the signal passing through each map. The resulting wavefront could be recorded holographically and the hologram could be used as a substitute for the maps and modulators.

Many different types of signals may be used, however the underlying principle of routing a signal through various maps is similar. Another possibility comprises mechanical signal means such as an ultrasonic wave. Many effects can be used to modulate this sound wave. Maps constructed with various acoustically reflective surfaces or conductive channels serve to associate given input signals with a given output. To pipeline such a system sufficient delays are needed to ensure modulator settling time. To multiplex the system signals of different frequencies are used. The requisite filtering can be accomplished by resonance effects. Error detection and correction can be implemented by triggering an error in response to the absence or degradation of a signal at the detectors.

The signal can also be provided by chemical means. The maps are implemented with chemical paths. A chemical reaction can be started which propagates along the paths. Processes which inhibit or catalyze the reaction serve as modulators, to distinguish the reactions along different paths. An example of such an existing chemical communications mechanism is the neuron. The computational information is not conveyed by the reaction mechanism but rather some other dimension of the signal, such as spatial. The important factor in this case is where a signal is not what it should be. To pipeline such a system sufficient delays would have to be insured to allow for the action time of the modulators. To multiplex such a system, independent reaction mechanisms and modulator agents share the chemical paths. Error detection and correction can be implemented by triggering an error in response to the absence or degradation of a reaction at the detection stage.

The foregoing examples using electrical optical, mechanical and chemical signals are representative herein of means for communication. In conjunction with the above residue techniques these means for communication also serve inherently to process arithmetic information.

I claim:

1. In a system for processing arithmetic information employing a residue number system employing a modulus including a processing segment associated with said modulus, a plurality of processing stages within said segment; each processing stage including at least one map means having input states and output states representing the same residue digits, one state for each residue digit; said output states being related to the input states by MOD (P (input state), $m_i$) where P is an integer polynomial, and $m_i$ is the modulus of the segments; and means routing the output of one map to the related input of the next map.

2. A system for processing arithmetic information employing a residue number system employing a plurality of moduli, comprising: a plurality of processing segments one for each modulus; each segment including a plurality of processing stages; each processing stage including at least one map means having input states and output states representing the same residue digits, one state for each residue digit; said output states being related to the input states by MOD (P (input state), $m_i$) where P is an integer polynomial, and $m_i$ is the modulus of the segment; and means routing the output of one map to the related input of the next map.

3. A system as in claim 2 in which P (input state) for selected stages is represented by (input state) + MOD ($d*w,m_i$) where $d$ is the content of a particular digit of the number to be added, $w$ is the weighting factor of the digit, and * represents multiplication whereby the processing in said maps is addition.

4. A system as in claim 2 in which P (input state) for selected stages is represented by (input state) + $m_i$ − MOD ($d*w,m_i$) where $d$ is the content of a particular digit of the number to be subtracted, $w$ is the weighting factor of the digit and * represents multiplication whereby the processing for said maps is subtraction.

5. A system as in claim 2 in which P (input state) is an integer polynomial transform.

6. A system as in claim 1 in which P (input state) for selected stages is respresented by (input state) + MOD ($d*w*c,m_i$) where $d$ is the contents of a particular digit, $w$ is the weighting factor, $c$ is a constant by which the number is multiplied, and * represents multiplication whereby a number is added after multiplication by a constant.

7. A system as in claim 2 in which P (input state) for selected stages is represented by (input state) + $m_i$ − MOD ($d*w*c,m_i$) where $d$ is the contents of the particular digit, $w$ is the weighting factor, $c$ is a constant and * represents multiplication whereby a number is substracted after multiplication by a constant.

8. A system as in claim 2 in which said P (input state) for selected stages is represented by (input state) − $r$ where $r$ is a residue digit of the associated modulus, $m_i$, and − indicates the operation of residue substraction.

9. A system as in claim 2 in which said P (input state) for selected stages is represented by (input state) + $r$ where $r$ is a residue digit of the associated modulus, $m_i$ and + indicates the operation of residue addition.

10. A system as in claim 2 in which said P (input state) for selected stages is represented by (input state) * $r$ where $r$ is a residue digit of the associated modulus, $m_i$, and * indicates the operation of residue multiplication.

11. A system as in claim 2 wherein selected ones of said routing means recondition the signal.

12. A system as in claim 2 for converting the residue digit output of said processing segments to mixed radix numbers comprising means for detecting the residue digit output of one processing segment, another processing segment, and at least one map means connected to control the output of said other processing segment, said at least one map means having input and output states with the output states related to the input state where P (input state) is related to ((input state) − $r$)$z$ where $r$ is the detected residue digit output of one processing segment and $z$ is the smallest number such that MOD ($z*m_n, m_i$) = 1, where $m_n$ is the modulus of the detected processing segment and $m_i$ is the modulus of the segment being controlled, and * represents multiplication.

13. A system as in claim 2 for converting the residue digit output of said processing segments to mixed radix numbers compresing means for detecting the residue digit output of one processing segment, map means connected to control the signal of another processing unit, said map means having input and output states with the output states related to the input states by ((input state) − $r$)$z$ where $r$ is the detected residue digit output of one processing segment and $z$ is the smallest number such that MOD ($z*m_n, m_i$) = 1, where $m_n$ is the modulus of the detected processing segment and $m_i$ is the modulus of the segment being controlled, said detecting means including means for detecting signal abnormalities, and means for by-passing said map means when a signal abnormality is detected.

14. A system as in claim 2 for converting the residue digit output of said processing segments to mixed radix numbers comprising means for detecting the residue digit output of one processing segment, at least one map means connected to control the output of another processing segment, said map means having input and output states with the output states related to the input states by ((input state) − 4)$z$ where $r$ is the detected residue digit output of one processing segment and $z$ is the smallest number such that MOD ($z*m_n,m_i$) = 1, where $m_n$ is the modulus of the detected processing segments and $m_i$ is the modulus of the segment being controlled, and means for delaying the input signals of the segment being controlled until the control has been effected.

15. A system as in claim 2 in which said map means of said stages includes a plurality of maps having the output states corresponding to each residue digit connected in common, each of said maps corresponding to a different integer polynomial, and in which said routing means selectively routes the output of the preceding stage to the map of the next stage having the desired integer polynomial.

16. A system as in claim 15 wherein said maps of said at least one of said stages have P (input state) represented by (input state) * $r$ where $r$ is a residue digit of the associated modulus $m_i$ and * represents multiplication, including additionally means for converting a multiplier to residue numbers, and means for employing said converted multiplier residue numbers to control the routing means of said at least one stage to control the routing of signals through a selected residue multiplier.

17. A system as in claim 2 wherein said arithmetic information comprises signals having identifying characteristics and said routing means includes means to distinquish a signal having a particular identifying characteristic passing through a particular map from the others to route the signal accordingly.

18. A system as in claim 17 in which said routing means includes modulators of a type serving to operate in a switch like manner to open or close for controlling the routing of signals from one map to another map.

19. A system as in claim 17 in which said routing means tags the portion of the signal which has passed through the desired maps in a manner which permits it's subsequent detection.

20. A system as in claim 19 wherein the routing means tags the portions of the signal which passes through each map in a unique manner such that the portion of the arithmetic information signal that travelled in a particular manner can be later identified by a particular set of markings.

21. A system for processing arithmetic information employing a residue number system employing a plurality of moduli comprising: a plurality of processing segments one for each moduli; each segment including a plurality of processing stages; each processing stage including at least one map means having input states and output states representing the same residue digits, one state for each residue digit; the maps for each stage being selected to have their output states related to the input states by the relationship of $$\text{MOD}((\text{input state}) + \text{MOD}(d*w,m_i),m_i)$$

where $m_i$ is the modulus of the segment, $d$ is the content of a particular digit of the number to be added, $w$ is a weighting factor, * represents multiplication, and means routing the output of one map to the related input of a selected map in the next stage.

22. A system for processing arithmetic information employing a residue number system employing a plurality of moduli comprising: a plurality of processing segments one of each modulus; each segment including a plurality of processing stages; each processing stage including at least one map means having input states and output states representing the same residue digits, one state for each residue digit; the maps for each stage being selected to have their output states related to the input states by the relationship of MOD((input state) + ($m_i − d*w,m_i$), $m_i$) where $m_i$ is the modulus of the segment, $d$ is the content of a particular digit of the number to be added, $w$ is a weighting factor, * represents multiplication, and means routing the output of one map to be related input of a selected map in the next stage.

23. A system for processing arithmetic information employing a residue number system employing a plurality of moduli comprising: a plurality of processing segments one for each modulus; each segment including a plurality of processing stages; each processing stage including at least one map means having input states and output states representing the same residue digits, one state for each residue digit; the maps for each stage being selected to have their output states related to the input states by the relationship of MOD((input state) + MOD($d*w*c,m_i$) where $m_i$ is the modulus of the segment, $d$ is the content of a particular digit of the number to be added, $w$ is a weighting factor, * represents multiplication, and $c$ is a constant, and means routing the output of one map to the related input of a selected map in the next stage.

24. A system for processing arithmetic information employing a residue number system employing a plurality of moduli comprising: a plurality of processing segments one of each modulus; each segment including a plurality of processing stages; each processing stage including at least one map means having input states and output states representing the same residue digits, one state for each residue digit; the maps for each stage being selected to have their output states related to the input states by the relationship of MOD((input state) + ($m_i$ − MOD($d*w*c,m_i$)$m_i$) where $m_i$ is the modulus of the segment, $d$ is the content of a particular digit of the number to be added, $w$ is a weighting factor, * represents multiplication, and $c$ is a constant, and means routing the output of one map to the related input of a selected map in the next stage.

25. A system for processing a plurality of arithmetic information signals each having an identifying characteristic, said system employing a residue number system having a plurality of moduli comprising: a plurality of processing segments, one for each modulus, each segment including a plurality of processing stages, each processing stage including at least one map means having input states and output states said output states being related to the input states by MOD (P (input state), $m_i$) where P is an integer polynominal, $m_i$ is the modulus of the segment; and means identifying and independently routing a plurality of signals representative of independent computations from the corresponding outputs of one map to the corresponding inputs of the next map so that a plurality of information signals can be simultaneously processed by a given stage.

26. A system as in claim 25 wherein the signal routing means includes means for distinguishing a signal having a particular identifying characteristic passing through a particular map from another.

27. A system as in claim 26 wherein said routing means are of a type which behave in a switch like manner to open or close.

28. A system as in claim 26 in which said routing means tags the portion of the signal which has passed through the desired maps in a manner which can later be discriminated.

29. A system as in claim 28 wherein the routing means tags the portions of the signal which passes through each map in a unique manner such that the portion of the signal that travelled in a particular manner can be identified by a particular set of markings.

30. A system for processing arithmetic information signals employing a residue number system having a plurality of moduli comprising; a plurality of proccessing segments, one for each moduli, each segment including a plurality of processing stages, each processing stage including at least one map means having inputs and outputs, said outputs being related to the inputs by MOD (P (input state), $m_i$) where P is an integer polynomial and $m_i$ is the modulus of the segment; means routing the outputs of one map of the corresponding inputs of the next map; and means for controlling the routing means so that a plurality of information signals can be processed by different stages of each segment simultaneously.

31. A system for processing a plurality of arithmetic information signals each having an identifying characteristic, said system employing a residue number system having a plurality of moduli comprising; a plurality of processing segments, one for each modulus, each segment including a plurality of processing stages, each processing stage including at least one map means having input states and output states said digit output states being related to the input states by MOD (P (input state), $m_i$) where P is an integer polynomial, $m_i$ is the modulus of the segment; means identifying and independently routing a plurality of signal representative of independent computations from the corresponding outputs of one map to the corresponding inputs of the next map so that a plurality of information signals can be simultaneously processed by a given stage; and means for controlling the routing means so that a plurality of information signals can be processed by different stages of each segment simultaneously.

32. A system for processing arithmetic information signals employing a residue number system having a plurality of moduli comprising: a plurality of processing segments one for each modulus; each segment including a plurality of processing stages; each processing stage including at least one map means having input states and output stages, one state for each residue digit; the maps for each stage being selected to have their output states related to the input states by the relationship $$\text{MOD((input state)} + \text{MOD}(d*w,m_i),m_i)$$

where $m_i$ is the modulus of the segment, $d$ is the content of a particular digit of the number to be added, $w$ is a weighting factor, * represents multiplication; means routing the output of one map to the related input of a selected map in the next stage; and means for controlling the routing means so that a plurality of information signals can be processed by different stages of the same segment simultaneously.

33. A system for processing arithmetic information signals employing a residue number system having a plurality of moduli comprising: a plurality of processing segments one for each modulus; each segment including a plurality of processing stages; each processing stage including at least one map means having input states and output states, one state for each residue digit; the maps for each stage being selected to have their output states related to the input states by the relationship MOD((input state) + ($m_i$ + MOD($d*w,m_i$),$M_i$) where $m_i$ is the modulus of the segment, $d$ is the constant of a particular digit of the number to be added, $w$ is a weighting factor, * represents multiplication; and means routing the output of one map to be related input of a selected map in the next stage.

34. A system for processing arithmetic information signals employing a residue number system having a plurality of moduli comprising: a plurality of processing segments one for each modulus; each segment including a plurality of processing stages; each processing stage including at least one map means having input states and output states, one state for each residue digit; the maps for each stage being selected to have their output states related to the input states by the relationship MOD((input state) + MOD($d*w*c, m_i$),$m_i$) where $m_i$ is the modulus of the segment, $d$ is the content of a particular digit of the number to be added, $w$ is a weighting factor, * represents multiplication, and $c$ is a constant; means routing the output of one map to the related input of a selected map in the next stage.

35. A system for processing arithmetic information signals employing a residue number system having a plurality of moduli comprising: a plurality of processing segments one of each modulus; each segment including a plurality of processing stages; each processing stage including at least one map means having input states and output states, one state for each residue digit; the maps for each stage being selected to have their output states related to the input states by the relationship MOD((input state) + ($m_i$ − MOD($d*w*c, m_i$)$m_i$) where $m_i$ is the modulus of the segment, $d$ is the content of a particular digit of the number to be added, $w$ is a weighting factor, * represents multiplication, and $c$ is a constant; means routing the output of one map to the related input of a selected map in the next stage.

36. A system for processing arithmetic information signals each having an identifying characteristic, said system employing a residue number system having a plurality of moduli comprising: a plurality of processing segments one for each modulus; each segment including a plurality of processing stages; each processing stage including at least one map means having input states and output states, one state for each residue digit; the maps for each stage being selected to have their output states related to the input states by the relationship of MOD((input state) + MOD($d*w, m_i$),$m_i$)

where $m_i$ is the modulus of the segment, $d$ is the content of a particular digit of the number to be added, $w$ is a weighting factor, * represents multiplication; means identifying and independently routing a plurality of signals representative of independent computations from the corresponding outputs of one map to the corresponding inputs of the next map so that a plurality of information signals can be simultaneously processed by a given stage; and means for controlling the routing means so that a plurality of information signals can be processed by different stages of the same segment simultaneously.

37. A system for processing arithmetic information signals each having an identifying characteristic, said system employing a residue number system having a plurality of moduli comprising a plurality of processing segments one for each modulus; each segment including a plurality of processing stages; each processing stage including at least one map means having input states and output states, one state for each residue digit; the maps for each stage being selected to have their output states related to the input states by the relationship: MOD ((input state) + ($m_i$ + MOD($d*w, m_i$),$m_i$) where $m_i$ is the modulus of the segment, $d$ is the content of a particular digit of the number to be added, $w$ is a weighting factor, and * represents multiplication, means identifying and independently routing a plurality of signals representative of indpendent computations from the corresponding outputs of one map to the corresponding inputs of the next map so that a plurality of information signals can be simultaneously processed by a given stage; and means for controlling the routing means so that a plurality of information signals can be processed by different stages of the same segment simultaneously.

38. A system for processing arithmetic information signals each having an identifying characteristic, said system employing a residue number system having a plurality of moduli comprising a plurality of processing segments one for each modulus; each segment including a plurality of processing stages; each processing stage including at least one map means having input states and output states, one state for each residue digit; the maps for each stage being selected to have their output states related to the input states by the relationship: MOD((input state) + MOD($d*w*c, m_i$),$m_i$) where $m_i$ is the modulus of the segment, $d$ is the content of a particular digit of the number to be added, $w$ is a weighting factor, * represents multiplication, and $c$ is a constant; means identifying and independently routing a plurality of signals representative of independent computations from the corresponding outputs of one map to the corresponding inputs of the next map so that a plurality of information signals can be simultaneously processed by a given stage; and means for controlling the routing means so that a plurality of information signals can be processed by different stages of the same segment simultaneously.

39. A system for processing arithmetic information signals each having an identifying characteristic, said system employing a residue number system having a plurality of moduli; comprising a plurality of processing segments one for each modulus; each segment including a plurality of processing stages; each processing stage including at least one map means having input states and output states, one state for each residue digit; the maps for each stage being selected to have their output states related to the input states by the relationship: MOD((input state) + ($m_i$ − ($d*w*c, m_i$)$m_i$) where $m_i$ is the modulus of the segment, $d$ is the content of a particular digit of the number to be added, $w$ is a weighting factor, * represents multiplication, and $c$ is a constant; means identifying and independently routing a plurality of signals representative of independent computations from the corresponding outputs of one map to the corresponding inputs of the next map so that a plurality of information signals can be simultaneously processed by a given stage; and means for controlling the routing means so that a plurality of information signals can be processed by different stages of the same segment simultaneously.

40. A system capable of performing arithmetic operations employing a residue number system having a plurality of moduli which comprises: a plurality of modular processing segments, one for each modulus and each having signal input means for receiving a signal to be processed; each of said processing segments including a plurality of map means, each map means having inputs and outputs, said outputs being related to the inputs by MOD (P(input state), $m_i$), where P is an integer polynomial and $m_i$ is the modulus of the modular unit; routing means for routing the signal outputs of one map to corresponding signal inputs of the next map, and means for controlling said routing means so that sequential signals are routed in close sequence through the map means corresponding to a portion of independent computation so that a plurality of signals are processed by different stages of the processing segment at the same time.

41. A system for performing arithmetic operations employing a residue number system having a plurality of modului which comprises: a plurality of modular processing segments, one for each modulus, each having signal input means for receiving and processing a plurality of individually identified signals, each of said segments including a plurality of map means, each map means having input and output states said output states being related to the input states by MOD (P(input state),$m_i$) where P is an integer polynomial and $m_i$ is the modulus of the modular unit; routing means receiving and identifying the output signals from a map and independently routing different signals to the next map means corresponding to a portion of the desired computation whereby the output of each processing segment for each signal corresponds to the results of different computations.

42. A system as in claim 41 wherein the signal routing means includes means for distinguishing a signal having a particular identifying characteristic passing through a particular map from another.

43. A system as in claim 42 wherein said routing means behave in a switch like manner to open or close.

44. A system as in claim 42 in which said routing means tags the portion of the signal which has passed through the desired maps in a manner which can be later discriminated.

45. A system as in claim 41 wherein the routing means tags the portion of the signal which passes through each map in a unique manner such that the portion of the signal that travelled in a particular manner can be identified by a particular set of markings.

46. A system capable of performing arithmetic operations with electrical signals which comprises: a plurality of electrical signal processing segments each including a plurality of stages; each stage including at least one map means which spatially transform the computational dimension of a signal by conductive paths, the numeric nomenclature associated with input states and output states of the maps being related as follows: output state = MOD (P(input state), $m_i$) where P is an integer polynomical and $m_i$ is the modulus of the processing segment; and electrical signal routing means for routing the signal from maps of a preceding stage to a selected map of a succeeding stage to perform a portion of the desired computation.

47. A system as in claim 46 including means for controlling said routing means so that the signals are routed in close succession through the stages so that a plurality of signals can be simultaneously processed by each of said segments.

48. A system as in claim 46 in which said electrical signals include identifying characteristics and in which said routing means identifies and routes signals simultaneously through independently selected maps of a related stage.

49. A system as in claim 48 wherein identifying characteristics are frequency characteristics and the routing means includes frequency filter means.

50. A system as in claim 48 wherein the signal routing means comprises modulators which differentiate the portion of the signal passing through a particular map from other maps.

51. A system as in claim 50 wherein the modulators are transistors.

52. A system as in claim 50 wherein the modulators are diodes.

53. A system capable of performing arithmetic operations with optical signals which comprises: a plurality of optical signal processing segments each including a plurality of stages; each stage including at least one map means which spatially transform the computational dimension of the signal by optical paths, the numeric nomenclature associated with input states and output states of the maps related as follows: output state = MOD(input state),$m_i$) where P is an integer polynomial and $m_i$ is the modulus of the processing segment; and optical signal routing means for routing the signal from maps of a preceding stage to a selected map of a succeeding stage to perform a portion of the desired computation.

54. A system as in claim 53 including means for controlling said routing means so that the signals are routed in close succession through the stages so that a plurality of signals can be simultaneously processed by each of said segments.

55. A system as in claim 53 wherein the spatial associations of the map means are implemented by reflective surfaces.

56. A system as in claim 53 wherein the optical signals are coherent and monochromatic and the spatial associations of the map means are implemented via holograms.

57. A system as in claim 53 wherein the spatial associations of the map means are implemented by light conductive paths.

58. A system as in claim 53 including means for controlling said routing means so that the signals are routed in close succession through the stages so that a plurality of signals can be simultaneously processed by each of said segments.

59. A system as in claim 53 in which said optical signals include identifying characteristics and in which said routing means identifies and sorts signals simultaneously through independently selected maps of a related stage.

60. A system as in claim 53 in which said optical signals include identifying characteristics and in which said routing means identifies and sorts signals simultaneously through independently selected maps of a related stage.

61. A system as in claim 60 wherein identifying characteristics are optical frequency characteristics and the routing means includes frequency filter means.

62. A system as in claim 61 wherein the signal routing means comprises modulators to differentiate the portion of the signal passing through each map from other maps and detectors sensitized to particular traits indicative of a particular route which corresponds to a particular calculation.

63. A system as in claim 60 wherein the identifying characteristics of said signals have different frequency characteristics and said routing means includes frequency selective filter means.

64. A system as in claim 53 wherein the signal routing means comprises modulators which differentiate the portion of the signal passing through a particular map from other maps and detectors sensitive to only the properly differentiated portion of the signals.

65. A system as in claim 64 wherein said modulators affect the polarization of the optical signal.

66. A system as in claim 64 wherein the modulators affect the phase of the optical signal.

67. A system as in claim 64 wherein the modulators affect the amplitude of the optical signal.

68. A system as in claim 64 wherein the modulators affect the spatial dimension of the optical signal.

69. A system as in claim 64 wherein the modulators affect the spatial frequency of the optical signal.

70. A system as in claim 64 wherein the detectors are made selective to the properly differentiated signal via the action of filter means.

71. A system as in claim 53 wherein the identifying characterics of said wherein the signals are coherent and monochromatic having different spatial frequency characteristics, and said routing means is made selective by spatial frequency filter means.

72. A system for processing arithmetic information employing a residue number system employing a plurality of moduli, comprising: a plurality of processing segments one for each modulus; each segment including a plurality of processing stages; each processing stage including at least one map means having input states and output states representing the same residue digits, one state for each residue digit; said output states being related to the input states of MOD (P (input state), $m_i$) where P is an integer polynominal, and $m_i$ is the modulus of the segment; means routing the output of one map to the related input of the next map; means for detecting the output of each of said segments; and means for monitoring the detected signals for signal abnormalities and excluding segments having abnormal signal information from affecting other segments.

* * * * *